United States Patent
Lee et al.

(10) Patent No.: US 11,524,924 B2
(45) Date of Patent: Dec. 13, 2022

(54) SIC COMPOSITE AND METHOD FOR MANUFACTURING THE SAME

(71) Applicant: KOREA INSTITUTE OF MACHINERY & MATERIALS, Daejeon (KR)

(72) Inventors: Sea-Hoon Lee, Changwon-si (KR); Ji-An Gu, Changwon-si (KR); Hee-Jung Lee, Seoul (KR)

(73) Assignee: KOREA INSTITUTE OF MACHINERY & MATERIALS, Daejeon (KR)

(*) Notice: Subject to any disclaimer, the term of this patent is extended or adjusted under 35 U.S.C. 154(b) by 145 days.

(21) Appl. No.: 16/748,909

(22) Filed: Jan. 22, 2020

(65) Prior Publication Data

US 2021/0198155 A1 Jul. 1, 2021

(30) Foreign Application Priority Data

Dec. 27, 2019 (KR) .................. 10-2019-0175931

(51) Int. Cl.
| | | |
|---|---|---|
| C04B 35/64 | (2006.01) | |
| C04B 35/626 | (2006.01) | |
| C04B 35/628 | (2006.01) | |

(52) U.S. Cl.
CPC .......... *C04B 35/64* (2013.01); *C04B 35/6264* (2013.01); *C04B 35/62655* (2013.01); *C04B 35/62863* (2013.01); *C04B 2235/3826* (2013.01); *C04B 2235/483* (2013.01); *C04B 2235/5244* (2013.01); *C04B 2235/5252* (2013.01); *C04B 2235/606* (2013.01); *C04B 2235/616* (2013.01); *C04B 2235/656* (2013.01)

(58) Field of Classification Search
CPC .......... C04B 35/6264; C04B 35/62863; C04B 35/62655; C04B 2235/656; C04B 2235/5244; C04B 2235/483; C04B 2235/5252; C04B 2235/616; C04B 2235/606; C04B 2235/3826
See application file for complete search history.

(56) References Cited

FOREIGN PATENT DOCUMENTS

| JP | 2006193383 | | 7/2006 | | |
|---|---|---|---|---|---|
| KR | 101101244 | | 1/2012 | | |
| KR | 101101244 B1 | * | 1/2012 | ............ | D06M 11/78 |
| KR | 20130071564 A | * | 7/2013 | ........... | C01B 32/956 |

(Continued)

OTHER PUBLICATIONS

Sea-Hoon Lee et al., "Effects of slurry concentration on the properties of SiCf/SiC fiber-reinforced ceramic composites made by precursor impregnation and pyrolysis process", 43rd International Conference and Exposition on Advanced Ceramics and Composites, Jan. 27-Feb. 1, 2019, Hilton Daytona Beach Resort and Ocean Center, Daytona Beach, Florida, USA.

(Continued)

*Primary Examiner* — Noah S Wiese
(74) *Attorney, Agent, or Firm* — Lex IP Meister, PLLC

(57) ABSTRACT

The present invention relates to a SiC composite and a method for manufacturing the same. More particularly, the present invention relates to a slurry composition for ceramic matrix composites which can not only reduce the number of precursor impregnation pyrolysis (PIP) cycles but also be useful in the PIP process to increase hardness, thermal stability, and relative density.

10 Claims, 25 Drawing Sheets

(56) References Cited

FOREIGN PATENT DOCUMENTS

| KR | 1020130071564 | 7/2013 | | |
|---|---|---|---|---|
| KR | 1020150066176 | 6/2015 | | |
| WO | WO-2018136631 A2 * | 7/2018 | ....... | C04B 35/62675 |
| WO | WO-2018181130 A1 * | 10/2018 | ......... | H01L 21/3065 |

OTHER PUBLICATIONS

Viet Hung Vu et al., "Highly concentrated aqueous SiC slurry containing fine SiC powder: A new approach for ultra-dense green body", Int J Appl Ceram Technol. 2019;00:1-8. DOI: 10.1111/ijac.13398.

KIPO, Office Action of KR 10-2019-0175931 dated Apr. 12, 2021.

* cited by examiner

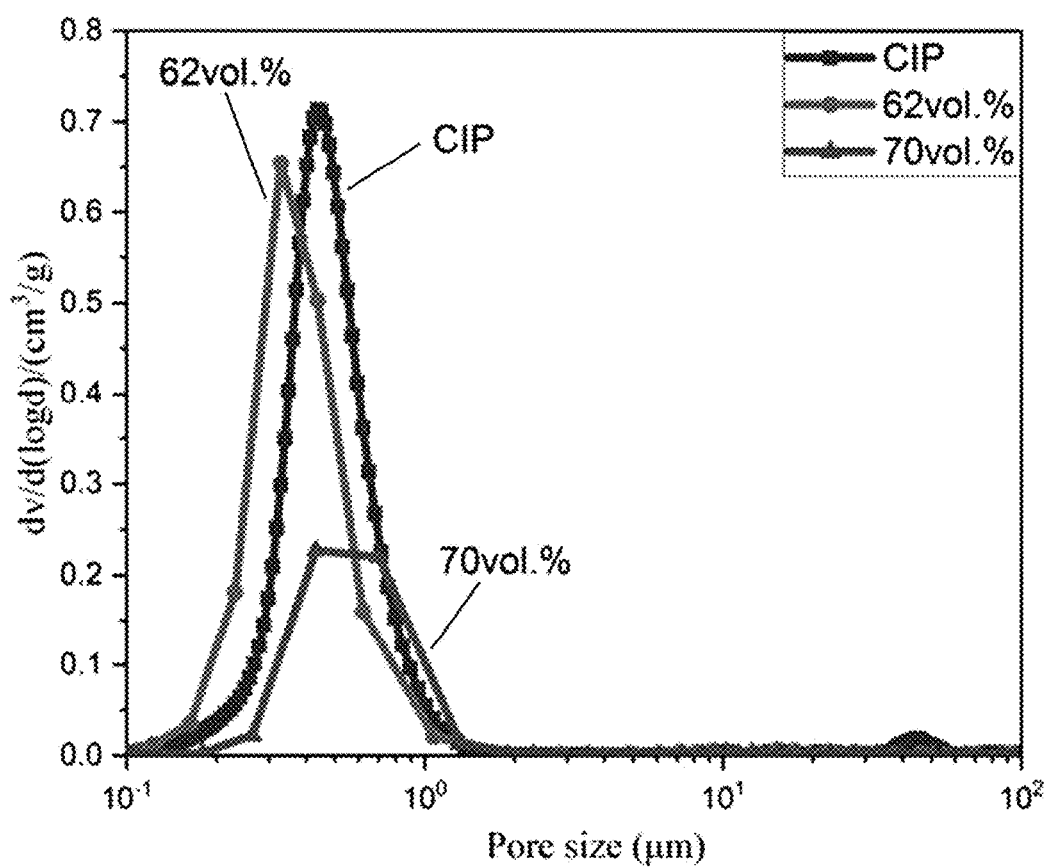

SIC COMPOSITE AND METHOD FOR MANUFACTURING THE SAME

CROSS REFERENCE TO RELATED APPLICATION(S)

This application claims the benefit under 35 USC § 119(a) of Korean Patent Application No. 10-2019-0175931 filed on Dec. 27, 2019 in the Korean Intellectual Property Office, the entire disclosure of which is incorporated herein by reference for all purposes.

BACKGROUND

1. Field

The present invention relates to a SiC composite and a method for manufacturing the same.

2. Description of Related Art

SiC as high temperature structural ceramic has attracted many attentions due to its excellent properties, including high flexural strength and hardness, good oxidation resistance and chemical stability, etc. Those outstanding properties make a variety of application for the aircrafts and nuclear power plant components. In spite of these superior properties, its intrinsic setback of poor sinterability due to the covalent bonding character suppresses the further application.

It has been reported that an obvious improvement of sinterability of SiC ceramic has been obtained via adding sintering additives and/or applying pressure. However, the sintering temperature or applied pressure is still relatively high of 2000° C. or higher and 20 MPa or higher, respectively. Moreover, the sintering aids would convert into second phases present in the matrix or remained at the grain boundaries, which may cause damages on the high-temperature mechanical property.

At a relative low temperature or even without applied pressure the densification of the SiC ceramic can be occurred by a precursor impregnation pyrolysis (PIP) process. The PIP process allows SiC ceramics with excellent high-temperature properties, including excellent creep resistance, thermal stability and chemical stability. The PIP process is generally employed for the densification of the $SiC_{particulate}/SiC$ ($SiC_p/SiC$) and $SiC_{fiber}/SiC$ ($SiC_f/SiC$) composite as the ceramic matrix. However, at least 6 PIP cycles have to be adapted to satisfy with an acceptable densification due to the occurrence of degassing and shrinkage of polymer during the pyrolysis, which leads to large time and costs and limits industrial mass production. In order to reduce the number of PIP cycles, a high concentration of colloidal SiC slurry can be filled between cavities of fibers. However, there has been limitation in concentration of slurry to date.

JP Patent Publication no. 2006-193383, ceramic composite material which can be efficiently cooled by a small amount coolant gas is disclosed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present invention is to provide a slurry composition for highly concentrated ceramic matrix composites.

Another object of the present invention is to provide a method for economically and efficiently manufacturing high density SiC composites by significantly reducing the number of PIP cycles.

Still another object of the present invention is to provide a SiC composite which can not only significantly reduce the number of PIP cycles but also have improved hardness, thermal stability and relative density.

According to one aspect, there is provided a slurry composition for ceramic matrix composites, comprising: at least 58 vol % of a SiC filler; a dispersion medium; and a dispersant, wherein the SiC filler consists of only fine particles having a $D_{50}$ diameter of 200 nm or less or consists of the fine particles and coarse particles having a $D_{50}$ diameter of 3 μm or more in a ratio of 2:1 to 4.5:1.

According to an embodiment, the SiC filler may be oxidized.

According to an embodiment, the fine particles may have a $D_{50}$ diameter of 100 to 200 nm and the coarse particles may have a $D_{50}$ diameter of 3 to 20 μm.

According to an embodiment, the dispersion medium may be water and the dispersant may be included in an amount of 0.6 to 1.2 wt %.

According to another aspect, there is provided a SiC/SiC composite material which is a matrix of ceramic matrix composite, the SiC/SiC composite material comprising a SiC filler and a SiC-based precursor-derived ceramic, wherein a volume ratio of the SiC filler is 60 vol % or more based on the total volume, and wherein a relative density of a green body manufactured by a slurry molding is 60% or more.

According to still another aspect, there is provided a SiC particle-reinforced SiC composite manufactured by a precursor impregnation pyrolysis process of a green body prepared by drying the slurry composition for ceramic matrix composites and densification the result, wherein the composite has a hardness of 10 GPa or more after 4 or less PIP cycles.

According to an embodiment, the SiC particle-reinforced SiC composite may include 9.5 to 37 vol % of a precursor-derived ceramic phase.

According to an embodiment, a density of the SiC particle-reinforced SiC composite may be 2.5 to 3 g/cm³.

According to still another aspect, there is provided a method for manufacturing a SiC composite, the method comprising: i) preparing a slurry composition for ceramic matrix composites of the present invention; ii) impregnating the slurry into ceramic fiber bundles, carbon fiber bundles, or a fiber preform made thereof; iii) drying and stabilizing the fiber preform in which the slurry is impregnated; iv) impregnating a liquid ceramic precursor into the preform and curing the same to form a ceramic matrix composite preform; and v) pyrolyzing the ceramic precursor in the ceramic matrix composite preform.

According to an embodiment, the method for manufacturing a SiC composite may further include heat treating the slurry-impregnated fiber preform at a temperature of 1500° C. or higher to promote crystallization of the amorphous SiC filler and to remove oxides from the surface of the SiC filler at the step of iii) drying and stabilizing the fiber preform.

According to an embodiment, the method for manufacturing a SiC composite may further include thermally curing a liquid ceramic precursor to 150 to 350° C. at the step iv) of impregnating a liquid ceramic precursor into the preform and curing the same.

According to an embodiment, the ceramic precursor may include at least one of polysilane and polycarbosilane.

Effects of the Present Invention

According to an embodiment, there is provided a slurry composition for highly concentrated ceramic matrix composites to provide a SiC/SiC composite material with improved hardness and relative density, which is a matrix of the ceramic matrix composite.

According to an embodiment, the number of PIP cycles can be dramatically reduced, thereby making it possible to economically and efficiently manufacture high density SiC composites.

According to an embodiment, there is provided a SiC composite with improved hardness, thermal stability and relative density while significantly reducing the number of PIP cycles.

Other features and aspects will be apparent from the following detailed description, the drawings, and the claims.

BRIEF DESCRIPTION OF THE DRAWNIGS

Figure 11:
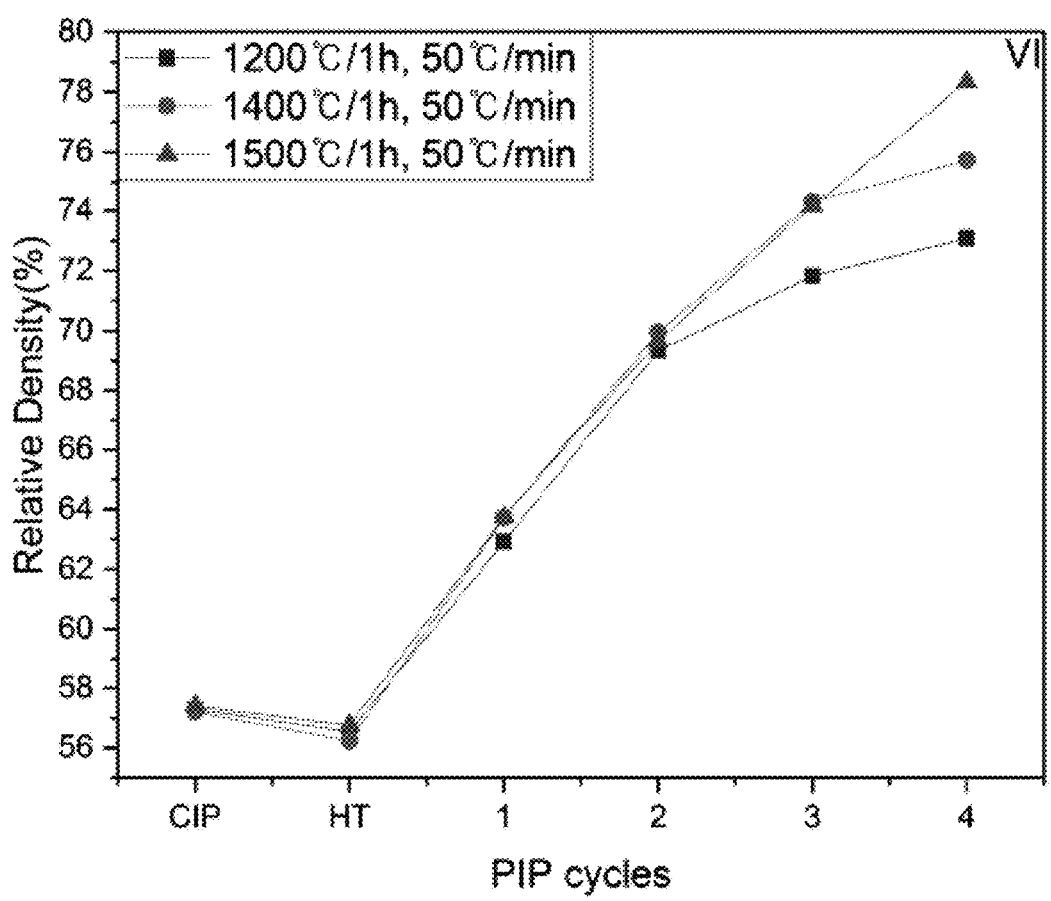
Figure 12A:
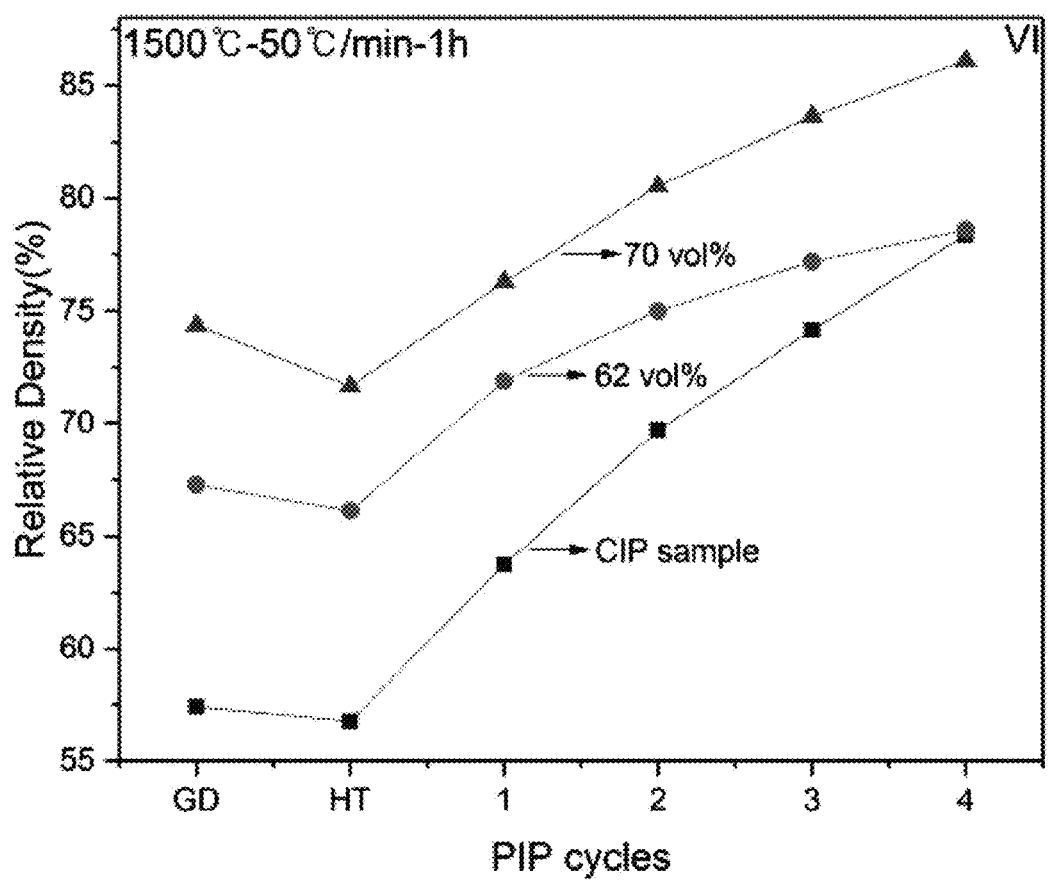

FIG. 11 is a graph illustrating the relative density depending on PIP cycles at heating temperature of 1200° C./hr, 1400° C./hr, 1500° C./hr. FIG. 12a is a graph illustrating the relative density depending on PIP cycles when a liquid ceramic precursor is impregnated through a vacuum impregnation (VI) in a green body prepared by cold isostatic pressing (CIP), a green body prepared with 62 vol % slurry, a green body prepared with 70 vol % slurry.

Figure 12B:
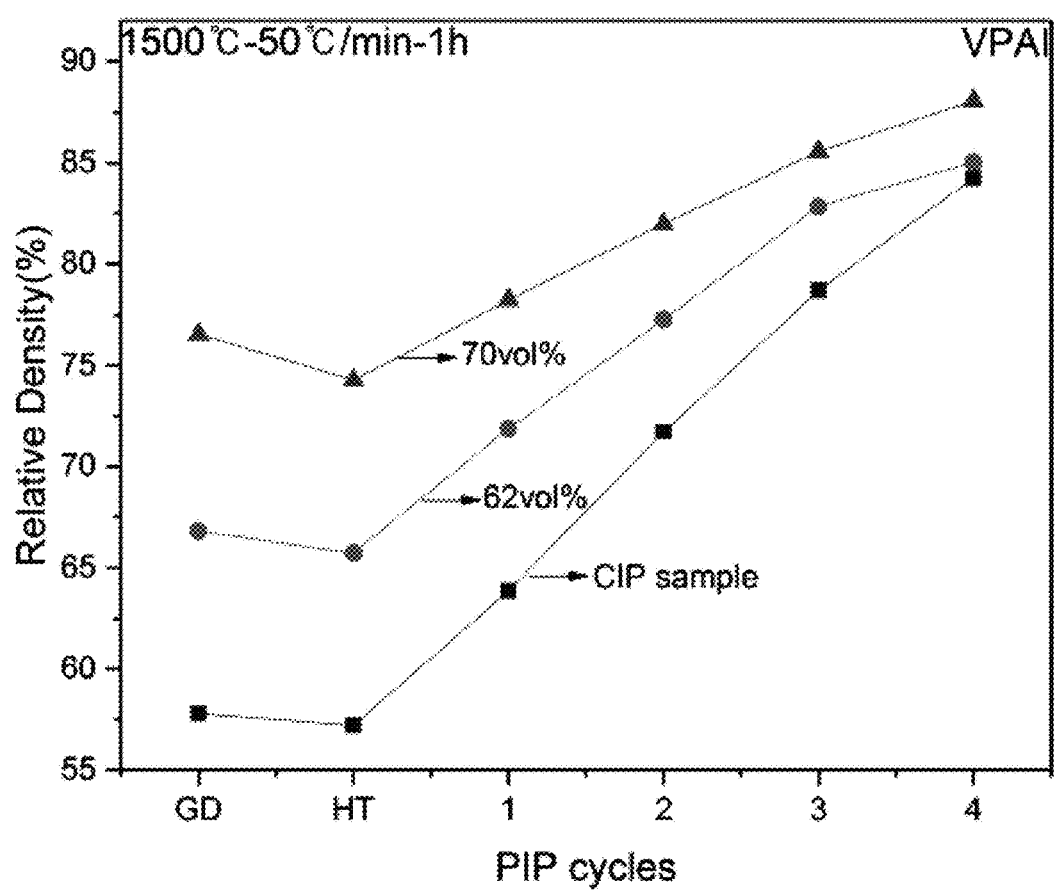

FIG. 12b is a graph illustrating the relative density depending on PIP cycles when a liquid ceramic precursor is impregnated through a vacuum and pressure assisted impregnation (VPAI) in a green body prepared by cold isostatic pressing (CIP), a green body prepared with 62 vol % slurry, a green body prepared with 70 vol % slurry.

FIG. 13a is a graph illustrating the pore size distribution of SiC green body.

Figure 13B:
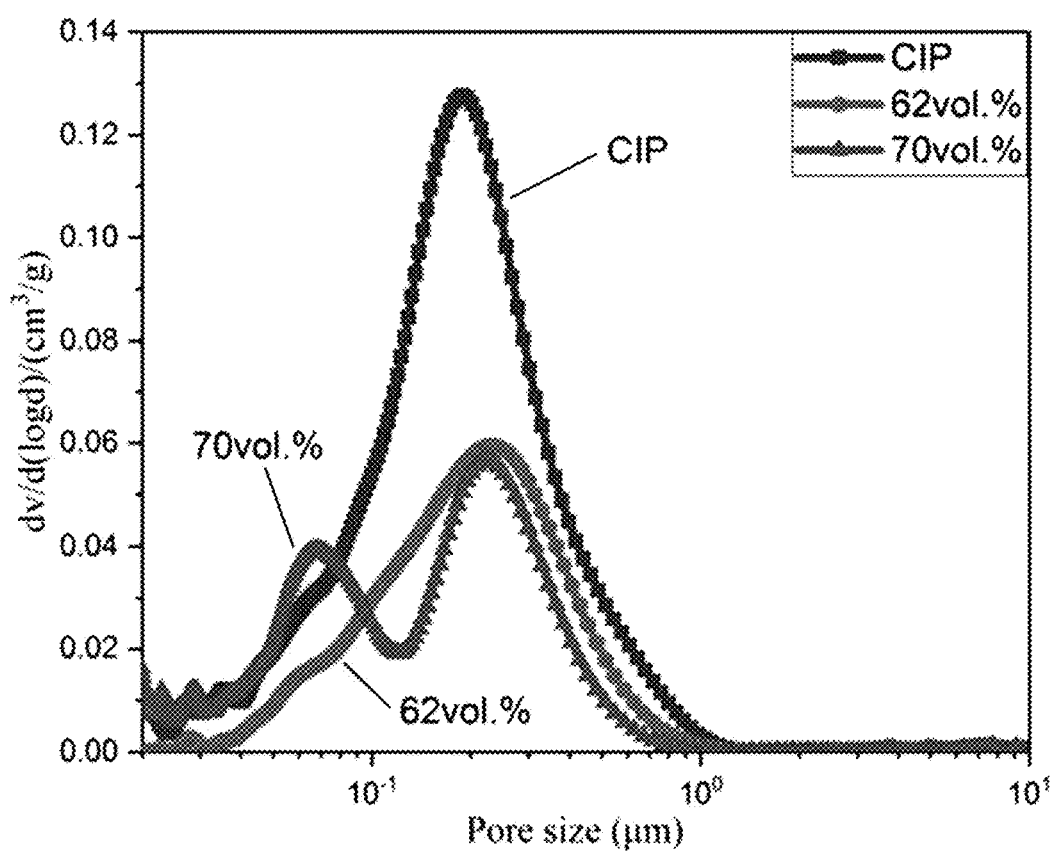

FIG. 13b is a graph illustrating the pore size distribution of samples after 4 PIP cycles at a pyrolysis temperature of 1,500° C.

Figure 14:
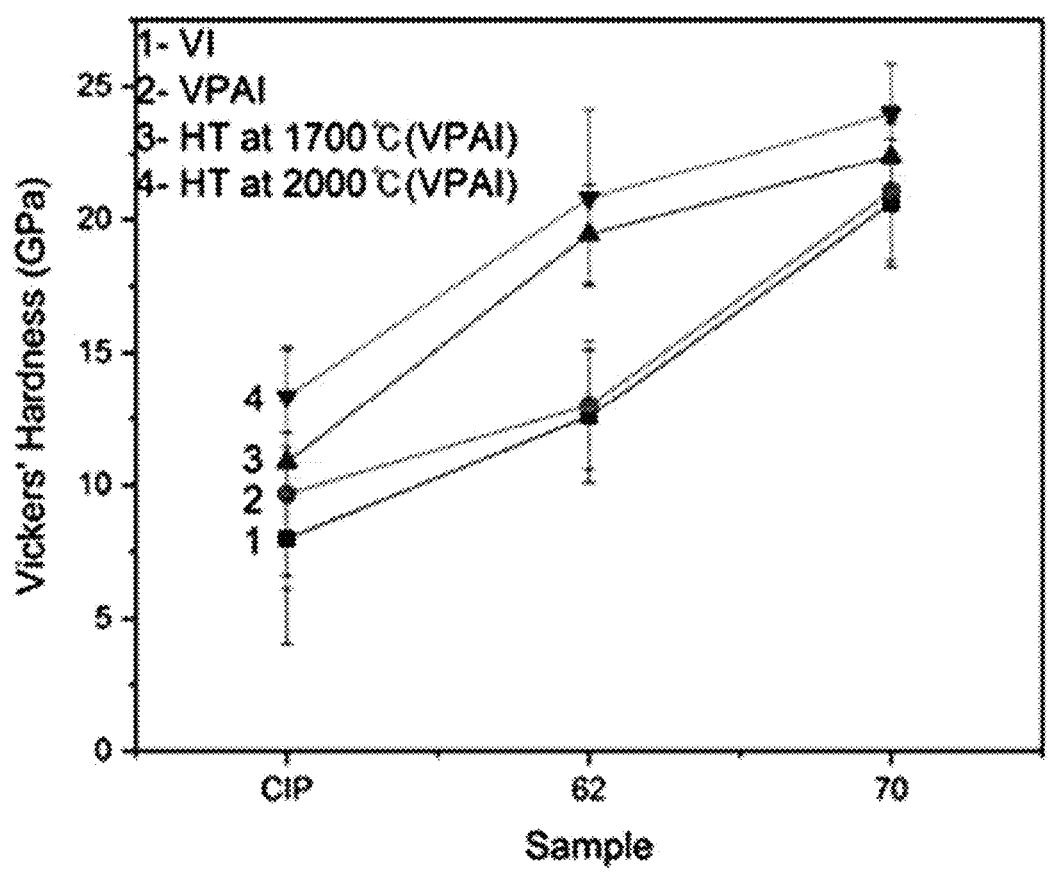

FIG. 14 is a graph illustrating the hardness of particle-reinforced composite (PRC) before and after heating at high temperature.

Figure 15A:
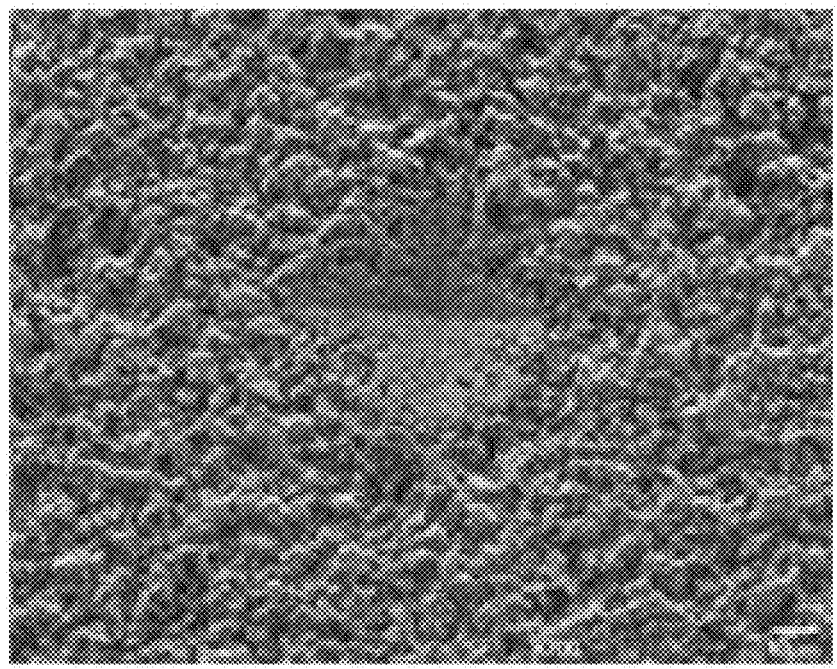

FIG. 15a is a diagram illustrating a particle-reinforced composite prepared by cold isostatic pressing (CIP).

Figure 15B:
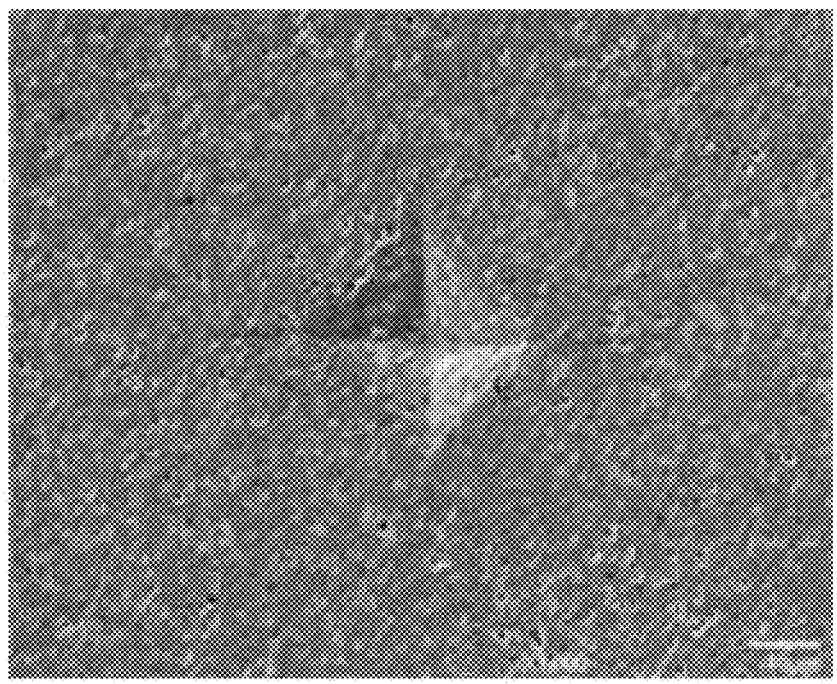

FIG. 15b is a diagram illustrating a particle-reinforced composite prepared with 62 vol % slurry.

Figure 15C:
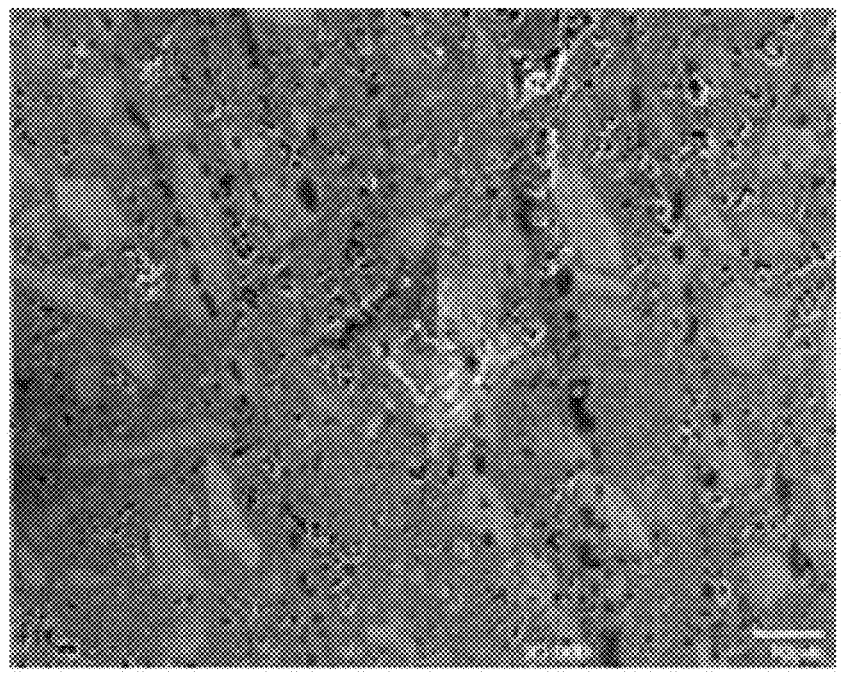

FIG. 15c is a diagram illustrating a particle-reinforced composite prepared with 70 vol % slurry.

Figure 15D:
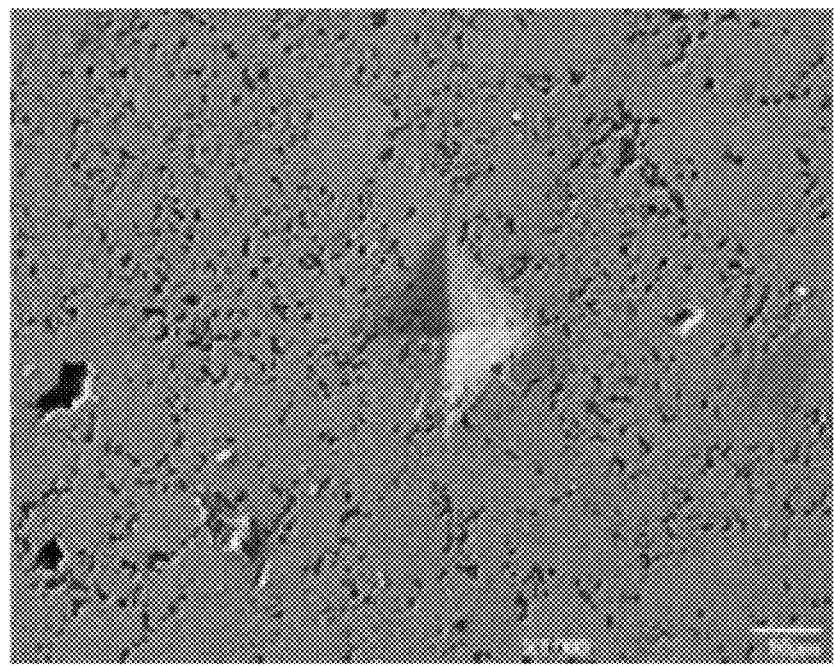

FIG. 15d is a diagram illustrating a 70 vol % particle-reinforced composite after heat-treating the sample of FIG. 15c at 1,700° C.

Figure 15E:
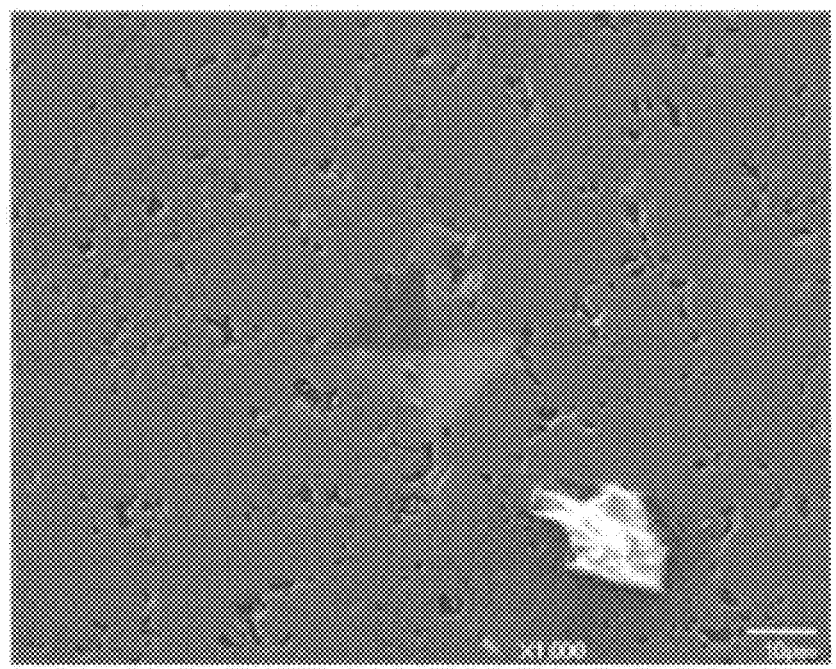

FIG. 15e is a diagram illustrating a 70 vol % particle-reinforced composite after heat-treating the sample of FIG. 15c at 2,000° C.

Figure 16:
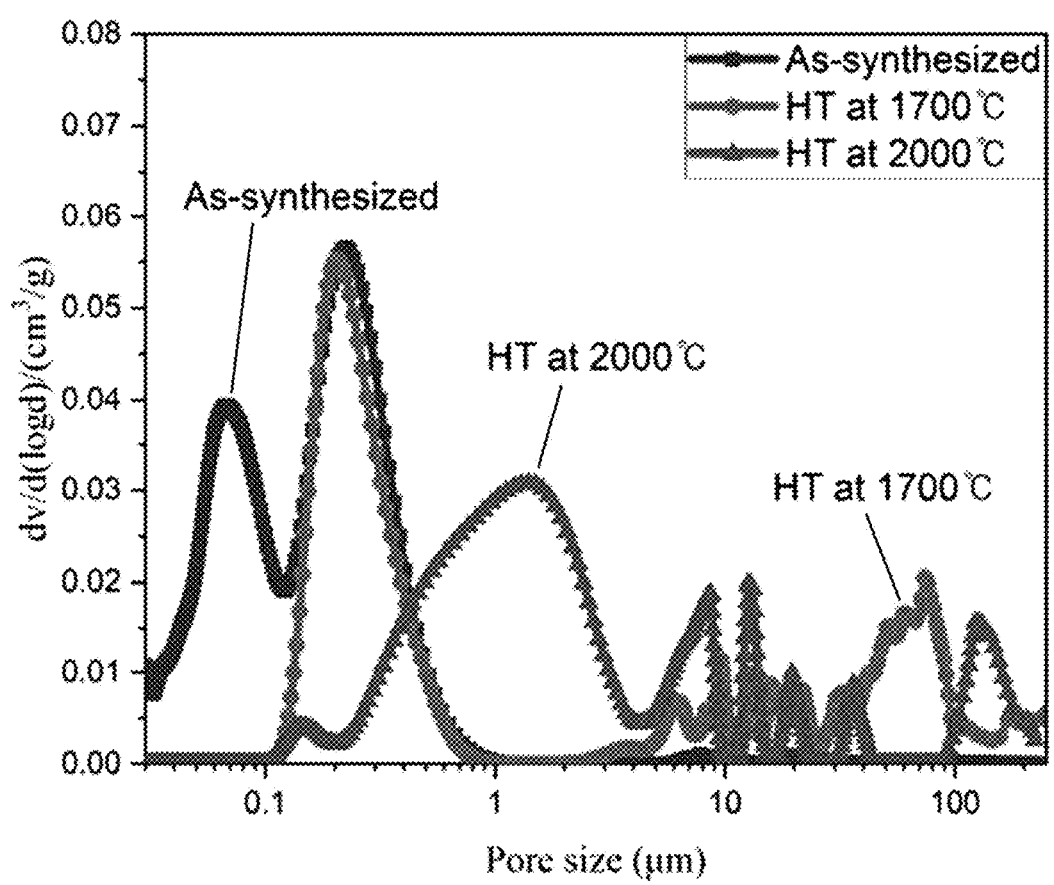

FIG. 16 is a graph illustrating the pore size distribution after heat-treating a particle-reinforced composite prepared by 4 PIP cycles with a 70 vol % slurry at 1,700° C. and 2,000° C. under Ar atmosphere for 1 hour.

Figure 17A:
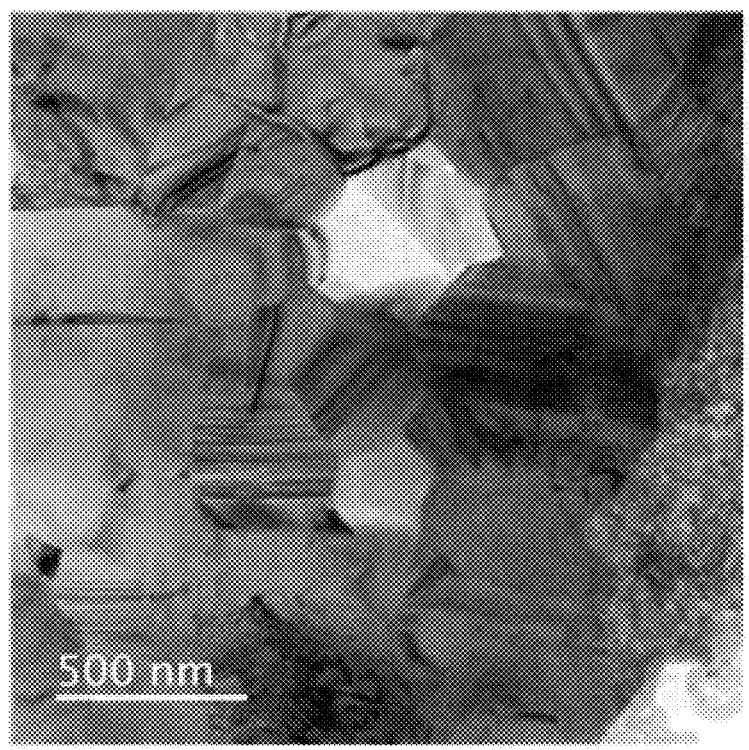
Figure 17B:
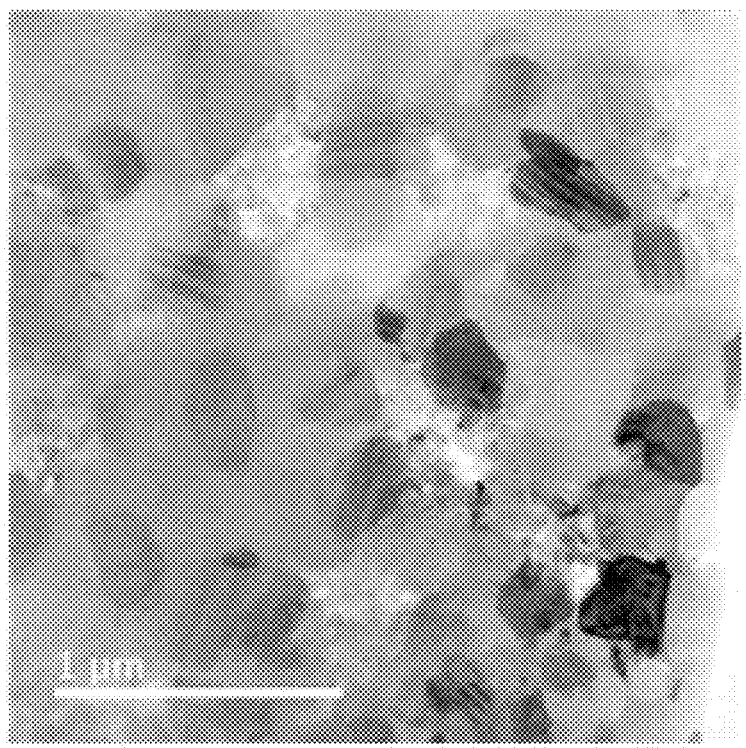

FIG. 17a and FIG. 17b are TEM images of particle-reinforced composite prepared by 4 PIP cycles with a 70 vol % slurry.

Figure 18:
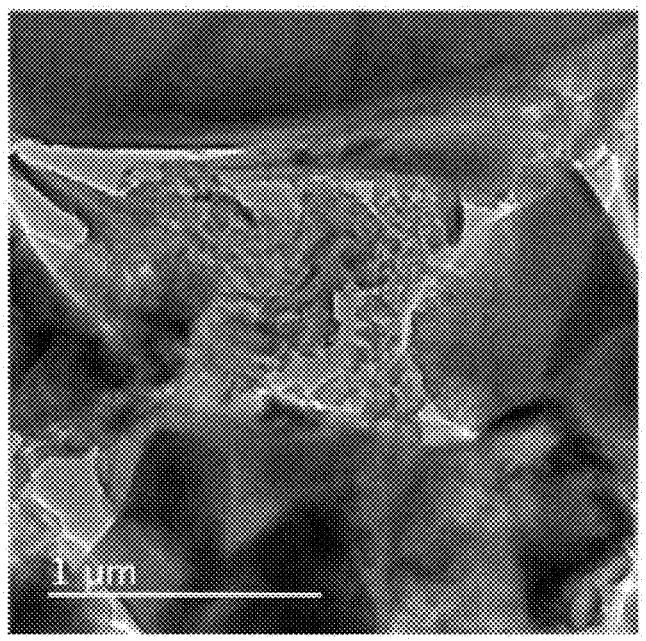

FIG. 18 is a TEM image of particle-reinforced composite prepared by 4 PIP cycles with a 70 vol % slurry after heat-treating under Ar atmosphere for 1 hour at 2,000° C.

Figure 19A:
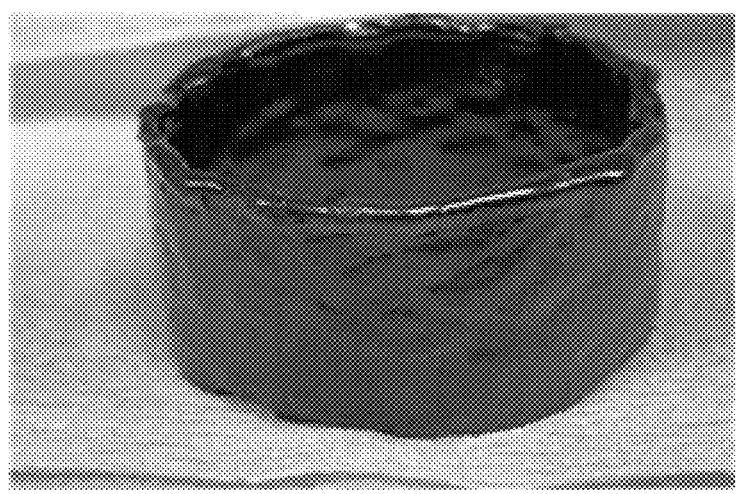

FIG. 19a is an image of a slurry, prepared by the method according to an embodiment of the present invention, impregnated into a SiC fiber preform.

Figure 19B:

FIG. 19b is an image of SiC$_f$/SiC ceramic matrix composite (CMC) prepared by repeating a PIP process in a SiC fiber preform.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The above and other objects, features and advantages of the present disclosure will become more apparent to those of ordinary skill in the art by describing in detail exemplary embodiments thereof with reference to the accompanying drawings.

The terms or words used in the present specification and claims are not to be interpreted in a conventional, dictionary sense, and the inventors may appropriately define the concept of terms in order to best describe their invention. It should be interpreted as meanings and concepts corresponding to the technical spirit of the present disclosure on the basis of the principle of the present invention.

In the present specification, when a component such as a layer, part, portion, or substrate is described as being "on", "connected", or "coupled" to another component, it is directly on another component "on", "connected", or "coupled" and may be interposed between one or more other components. In contrast, if a component is described as being "directly on", "directly connected", or "directly coupled" to another component, no other component may be interposed between the two components.

The terms used in the description are intended to describe certain embodiments only, and shall by no means restrict the present disclosure. Unless clearly used otherwise, expressions in the singular number include a plural meaning.

In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

In the present specification, when a part is said to "include" or "comprise" a certain component, it means that it may further include other components, without excluding the other components unless otherwise stated. In addition, throughout the specification, "on" means to be located above or below the target portion, and does not necessarily mean to be located above the gravity direction.

While the present disclosure has been described with reference to particular embodiments, it is to be appreciated that various changes and modifications may be made by those skilled in the art without departing from the spirit and scope of the present disclosure, as defined by the appended claims and their equivalents. Throughout the description of the present disclosure, when describing a certain technology is determined to evade the point of the present disclosure, the pertinent detailed description will be omitted.

Embodiments of the disclosure will be described below in more detail with reference to the accompanying drawings, in which those components are rendered the same reference number that are the same or are in correspondence, regardless of the figure number, and redundant explanations are omitted.

According to one aspect, a slurry composition for ceramic matrix composites includes at least 58 vol % of a SiC filler; a dispersion medium; and a dispersant, wherein the SiC filler consists of only fine particles having a $D_{50}$ diameter of 200 nm or less, or consists of the fine particles and coarse particles having a $D_{50}$ diameter 3 μm or more in a ratio of 2:1 to 4.5:1.

The slurry composition may include at least 58 vol %, preferably at least 60 vol %, more preferably at least 65 vol %, still more preferably at least 68 vol %, the most preferably at least 70 vol % of the SiC filler. When the content of the SiC filler is less than 58 vol %, it may not be suitable for preparing ceramic matrix composites having high density and improved hardness and it may be difficult to shorten the number of PIP cycles.

The $D_{50}$ diameter may be adjusted based on properties of a SiC/SiC composite material. The slurry composition may be made of only fine particles having a $D_{50}$ diameter of 200 nm or less, or of the fine particles and coarse particles having a $D_{50}$ diameter of 3 μm or more mixed in a ratio of 2:1 to 4.5:1, preferably 2.5:1 to 4.5:1, more preferably 3:1 to 4.5:1, and still more preferably 3:1 to 4:1.

The coarse particles are used to improve the dispersion behavior of the fine particles. Mixing the fine particles and the coarse particles in an appropriate ratio may be suitable for high concentration of slurry through dispersibility improvement. That is, when the ratio of the fine particles having a $D_{50}$ diameter of 200 nm or less and the coarse particles having a $D_{50}$ diameter of 3 μm or more is less than 2:1, the relative content of the coarse particles, which are not easily infiltrated into the pores of the fiber, is increased, thereby making it difficult to form a SiC/SiC composite material which is a matrix of ceramic matrix composite. On the other hand, when the ratio is greater than 4.5:1, the relative content of the fine particles, which has poor dispersibility in the slurry, is increased, thereby limiting the increase of a solid content in the slurry.

When the $D_{50}$ diameter of the fine particles is in a range of 100 to 200 nm and the $D_{50}$ diameter of the coarse particles is in a range of 3 to 20 μm, it may be preferable to provide a ceramic matrix composite having high density and improved hardness and shortening the number of the PIP cycles. However, the ranges thereof are not limited thereto. The $D_{50}$ diameter of the fine particles may be more preferably 120 to 180 nm. When the $D_{50}$ diameter of the fine particles is less than 100 nm, particle miscibility in the slurry may be reduced. On the other hand, when the $D_{50}$ diameter of the coarse particles is more than 20 μm, packing property of the SiC filler may be deteriorated.

The SiC filler may be oxidized. The surface area of the particles may be reduced by oxidation, thereby improving the dispersibility of the SiC filler and increasing the concentration of the slurry.

The dispersion medium may be water or ethanol, preferably water. However, it is not limited thereto.

The dispersant may be polyethylene glycol (PEG), polyacrylic acid (PAA), polymethacrylic acid (PMAA), polyacrylamide (PAAM), polyethyleneimine (PEI), or tetramethylammonium hydroxide (TMAH), preferably polyethylene glycol (PEG) or polyacrylic acid (PAA), and more preferably polyethylene glycol (PEG). However, it is not limited thereto.

Selection of a suitable dispersant is important to improve the rheological properties of the slurry. Polyelectrolytes such as polyacrylic acid (PAA) and polymethacrylic acid (PMAA) are generally used for the dispersion of ceramic powders in water, and polyethyleneimine (PEI) is a weak cationic polyelectrolyte.

When polyethylene glycol (PEG) or polyacrylic acid (PAA) is used as a dispersant, it is possible to maintain stable uniform dispersion of the SiC powder in the slurry and to increase the relative density of the green body of the SiC/SiC composite material.

In particular, PEG has one of the simplest structures among non-ionized water-soluble polymers and can be used for the casting of ceramics because of its excellent stability, low toxicity, and completely combustible properties.

Using a proper amount of PEG in the slurry composition, it is possible to obtain a green body with more rigid surface and without surface exfoliation after drying.

When PEG is used in a range of 0.6 to 1.2 wt % based on the entire slurry composition, it may be suitable to increase the strength of the green body.

According to another aspect, the SiC/SiC composite material of the present invention, which is a matrix of the ceramic matrix composite, includes a SiC filler and a SiC-based precursor-derived ceramic, wherein a volume ratio of the SiC filler to the total volume is 60 vol % or more, and wherein a sintered relative density of the green body produced by the slurry molding step is 60% or more.

When the SiC/SiC composite material of the present invention, which is a matrix of the ceramic matrix composite and in which a volume ratio of the SiC filler to the total volume is 60 vol % or more and a relative density of the green body produced by the slurry molding step is 60% or more, is used, it may allow producing SiC composites with improved hardness and relative density while significantly reducing the number of PIP cycles.

According to still another aspect, the SiC particle-reinforced SiC composite of the present application may be prepared by drying the slurry composition for ceramic matrix composites of the present invention to provide a green body and performing densification of the green body through the precursor impregnation pyrolysis (PIP), and have a hardness of 10 GPa or more after 4 PIP cycles.

According to the present application as described above, it is possible to provide a SiC particle-reinforced SiC composite with improved hardness and relative density while significantly reducing the number of PIP cycles using the slurry composition for highly concentrated ceramic matrix composites of the present application.

A content of the precursor-derived ceramic phase in the SiC particle-reinforced SiC composite may be 9.5 to 37 vol %. If the content of the precursor-derived ceramic phase is less than 9.5 vol %, the content of the precursor-derived ceramic in the SiC/SiC composite material may be greatly reduced, making low mechanical properties. On the other hand, if the content of the precursor-derived ceramic phase is more than 37 vol %, five times or more of PIP cycles may be required, which may not be economical.

A density of the SiC particle-reinforced SiC composite may 2.5 to 3 $g/cm^3$. If the density of the SiC particle-reinforced SiC composite is less than 2.5 $g/cm^3$, the hardness of the SiC composite may be too much lowered to obtain good mechanical properties. On the other hand, if it is more than 3 $g/cm^3$, five times or more of PIP cycles may be required, which may not be economical.

According to still another aspect, the method for manufacturing a SiC composite of the present invention includes: i) preparing a slurry composition for ceramic matrix composites of the present application; ii) impregnating the slurry into ceramic fiber bundles, carbon fiber bundles, or a fiber preform made thereof; iii) drying and stabilizing the fiber preform in which the slurry is impregnated; iv) impregnating a liquid ceramic precursor into the preform and curing the same to form a ceramic matrix composite preform; and v) pyrolyzing the ceramic precursor in the ceramic matrix composite preform.

In step i), a slurry composition including at least 58 vol % of a SiC filler; a dispersion medium; and a dispersant is prepared wherein the SiC filler is composed of only fine particles having a $D_{50}$ diameter of 200 nm or less or is composed of the fine particles and coarse particles having a $D_{50}$ diameter of 3 μm or more in a ratio of 2:1 to 4.5:1. As described above, it allows providing a SiC particle-reinforced SiC composite having excellent mechanical properties and 10 GPa or more of hardness after 4 PIP cycles by using the slurry composition of the present application.

In step iii), the slurry-impregnated fiber preform may be further heat-treated at a temperature of 1,500° C. or more to promote crystallization of the amorphous SiC filler and to remove oxides from the surface of the SiC filler. As described above, heat treatment at a temperature of 1,500° C. or more may be suitable for complete crystallization or oxide removal.

In step iv), it may include thermally curing the liquid ceramic precursor at 150 to 350° C. If the thermal curing temperature is less than 150° C., the liquid ceramic precursor may not be completely thermally cured. On the other hand, if the thermal curing temperature is greater than 350° C., damage to the preform may occur, and thus quality of the SiC composite may be degraded due to excessive thermal curing.

The ceramic precursor may include at least one of polysilane and polycarbosilane. By including the polysilane- or polycarbosilane-derived SiC ceramics, the SiC composite may be produced in a high yield.

In step v), it may be suitable to pyrolyze the ceramic precursor in the ceramic matrix composite preform at 1200° C. or higher, preferably at 1300° C. or higher, and more preferably at 1500° C. or higher. As described above, the relative density increases as the pyrolysis temperature increases.

EXAMPLES

Hereinafter, although more detailed descriptions will be given by examples, those are only for explanation and there is no intention to limit the disclosure.

Example 1

Preparation and Analysis of SiC Powder

Silicon (Si) (7 μm, purity: 99.4%, Zhejiang Kaihua Yuantong Silicon Industry, Zhejiang, China) and carbon black (purity: 99.9%, Alfa Aesar, Mass., USA) were used as raw materials for preparing mechanical alloying SiC (MA-SiC) powder. The MA-SiC powder was prepared by milling Si powder and carbon black using a planetary mill (Pulverisette 5/4; Fritsch, Idar-Oberstein, Germany) and SiC balls (φ5 mm; Nicato Co., Osaka, Japan) under 360 rpm for 72 hours. MA-SiC was referred to as fine SiC powder or particles. Commercially available SiC powder with average particle sizes of 3, 5, and 10 μm (Grand Co., Seoul, Korea) was referred to as coarse SiC powder, which was used to improve the dispersion behavior of MA-SiC (fine SiC) powder.

The crystalline phases were identified by X-ray diffraction (D/MAX 2500; Rigaku, Tokyo, Japan) using Cu-Kα radiation. A field emission scanning electron microscope (FE-SEM, JSM-6700F, Tokyo, Japan) and transmission electron microscope (TEM, JEM 2100F, Tokyo, Japan) were used to study the morphology and size of the powder.

Example 2

Oxidation of SiC Powder

The SiC powder was oxidized under controlled time and temperature conditions in air using an alumina crucible and a box furnace. The box furnace was preheated to 600° C. and the alumina crucible containing SiC powder was inserted to the furnace. The temperature quickly increased to a desired oxidation temperature. A rapid heating process was designed to minimize the neck formation between SiC powders during oxidation by minimizing holding time at high temperature. According to Quanli et al., an initial oxidation temperature of nano- and micro-sized SiC powders were 783° C. and 843° C., and the weight gain of the powder after oxidation increased with oxidation temperature and time. As a result, the oxidation temperatures of the fine SiC powder and the coarse SiC powder of the present invention were selected to be 800° C. and 850° C., respectively. The oxidation time at this preferred temperature was set to 1 hour. The morphology and surface area of the SiC powder were changed after the oxidation process. The morphology of the powder as well as the thickness of the silicon dioxide ($SiO_2$) layer formed on the surface of the SiC powder were analyzed using FE-SEM and TEM. The surface area of the fine SiC before and after oxidation was analyzed using a Brunauer-Emmett-Teller (BET) analyzer (Belprep2, Bel Japan, Inc., Japan).

Example 3

Preparation and Analysis of Slurries

The fine powder and the coarse SiC powder with or without oxidation treatment were used to prepare highly concentrated slurries. The dispersants were prepared by adding different amount of polyethylene glycol ((H(OCH$_2$CH$_2$)$_n$OH), 18.04+44.05n g/mol, Alfa Aesar, Heysham, England) into distilled water and mechanically stirring until homogeneous solutions were obtained. The fine SiC powder was added into the dispersant under stirring conditions and ultra-sonication (VCX750, Sonics and Materials, Conn., USA). The slurry was kept at cold by applying ice bath at the outside of the jar during sonication. After complete mixing of the dispersant and the powder, the suspension was sonicated for 30 minutes and the viscosity value was measured using a viscometer (HB DV-II+pro, Brookfield Engineering Laboratories, Mass., USA). The optimization process of the slurry was carried out by adjusting a pH value (using 0.5M NaOH and 0.1M HCl solution) and changing an amount of the dispersant. The stability of the slurry was tested by measuring the viscosity value after aging for one day without stirring. The prepared slurry was poured into a cylindrical mold and dried in an oven to produce a cylindrical-shaped green body. Properties including drying shrinkage and relative density of the green body were analyzed.

Because the preparation of highly concentrated slurries required relatively long processing time using SiC powder with high surface area, solid loading of the slurry increased during the slurry preparation by evaporation of water in the slurry. The actual solid content of the slurry was calculated by measuring the weight of water and powder in the slurry through the weight comparison of the slurry before and after drying.

Experimental Example 1

Properties of SiC Powders

Table 1 summarizes the dispersion properties of SiC powders reported in the literature.

TABLE 1

| Solid content (vol %) | Zeta Potential (mV) | Particle size (μm) | Surface area (m$^2$/g) | Sintering additives | Dispersant | Dispersoid | References |
|---|---|---|---|---|---|---|---|
| 70 | 50 | 1.2 + 118 | 0.0032-4.19 | — | PAAM | Water | [7] |
| 62 | — | — | — | — | PEI | Etanol | [8] |
| 57 | 40 | 0.60 | 9.034 | — | PEI, citric acid | Water | [9] |
| 54 | −37 | 0.58 | 15.24 | Al$_2$O$_3$, Y$_2$O$_3$ | TMAH | Water | [10] |
| 50 | 41 | 0.60 | 9.034 | Al$_2$O$_3$, Y$_2$O$_3$ | PEI, citric acid | Water | [11] |
| 47 | 32 | 3 | — | — | PEI | Water | [12] |
| 45 | — | 0.55 | 14-16 | Al$_2$BC$_3$ | PEI | Ethanol | [13] |
| 40 | — | 0.50 | 14.05 | — | PEI | Water | [14] |
| 40 | 50 | 0.88 | 10 | — | PEI | Water | [4] |
| 30 | — | 0.1 | 20 | Al$_2$O$_3$ | (NH$_4$OH) | Water | [15] |

Abbreviations: PAAM. Polyacrylamide; PEI. Polyethylene imine; TMAH. Tetramethyl ammonium hydroxide.

[1] Wei M, Zhang G, Wu Q. Processing of highly concentrated polyacrylamide-coated SiC suspensions. Ceram Int. 2004; 30:125-.31.

[2] Yoon B, Lee S H, Feng L. Dispersion and densification of nano Si—.(Al)—.C powder with amorphous/nanocrystalline bimodal microstructure. J Am Ceram Soc. 2018; 101(7):2760-.9.

[3] Zhang J, Xu Q, Ye F, et al. Effect of citric acid on the adsorption behavior of polyethylene imine (PEI) and the relevant stability of SiC slurries. Colloids Surf A. 2006; 276:168-.75.

[4] Zhang J, Jiang D, Lin Q, et al. Gelcasting and pressureless sintering of SiC ceramics using Al$_2$O$_3$.Y$_2$O$_3$ as the sintering additives. J Eu Ceram Soc. 2013; 33:16945-.1699.

[5] Zhang J, Iwasa M, Jiang D. Dispersion of SiC in liquid media with A1203 and Y203 as sintering additives. J Am Ceram Soc. 2005; 88:1013-.6.

[6] Zhang Y, Binner J. Effect of dispersants on the rheology of liquid SiC suspension. Ceram Int. 2008; 34:1381-.6.

[7] Lee S H, Sakka Y, Tanaka H, et al. Wet processing and low-temperature pressureless sintering of SiC using a novel Al$_3$BC$_3$ sintering additive. J Am Ceram Soc. 2009; 92:2888-.93.

[8] Zhang T, Zhang Z, Dong M, et al. The influence of polyethyleneimine on the gelcasting of SiC with two different initiators. J Am Ceram Soc. 2007; 90:3748-.52.

[9] Hirata Y, Yamada S, Fukushige Y. Colloidal processing of SiC. Matter Lett. 1993; 16:295-.9.

[10] Quanli J, Haijun Z, Suping LI, Xiaolin J. Effect of particle size on oxidation of SiC powders. Ceram Int. 2007; 33:309-.13.

Figure 1:
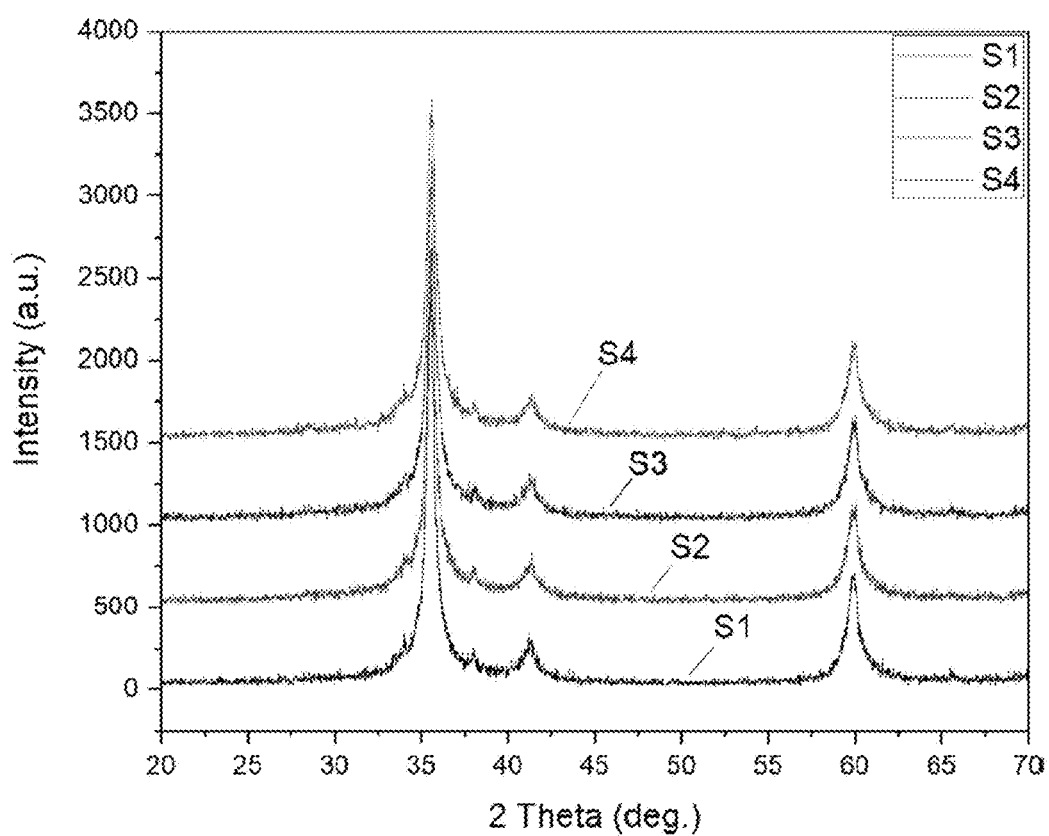
FIG. 1 is a graph illustrating the XRD pattern of mechanically alloyed SiC powder (MA-SiC powder).

FIG. 1 is a graph illustrating XRD patterns of SiC powders. S1, S2, S3, and S4 represent the fine SiC powders produced by using four batches provided inside the milling machine. As shown in FIG. 1, the peaks at 35°, 42°, and 60° proved that the ultrafine β-SiC powders were successfully synthesized.

FIG. 2a to FIG. 2e and FIG. 3a to FIG. 3c are FE-SEM and HR-TEM images of MA-SiC and coarse (10 μm) SiC powders before and after oxidation for 1 hour. From the SEM images, the average particle size of the fine SiC powder was 150 nm. Similar X-ray intensities of the SiC peaks and particle sizes proved that the synthesis of MA-SiC powder was reproducible.

Figure 3A:
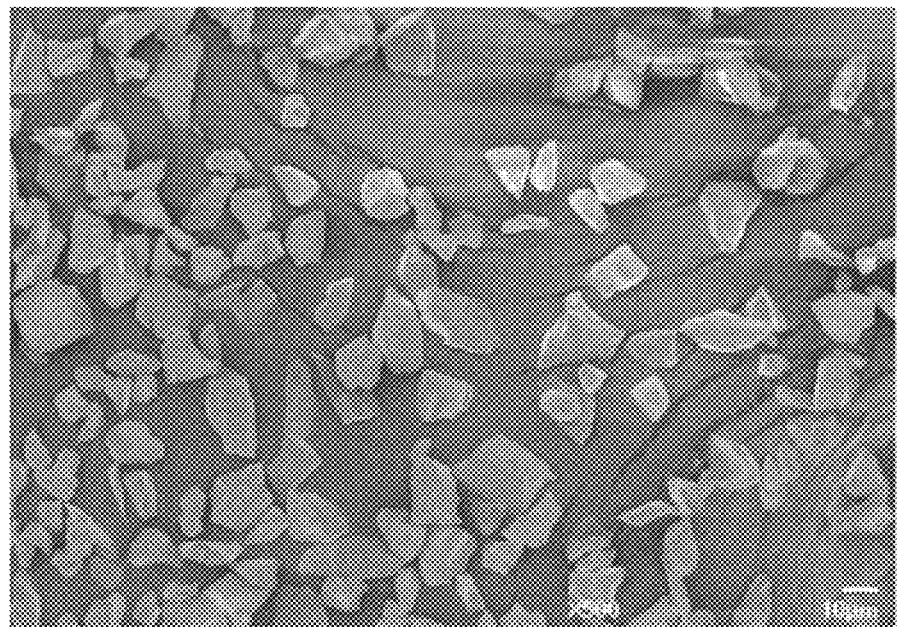
FIG. 3a is a FE-SEM image of coarse (10 μm) SiC powder.
Figure 3B:
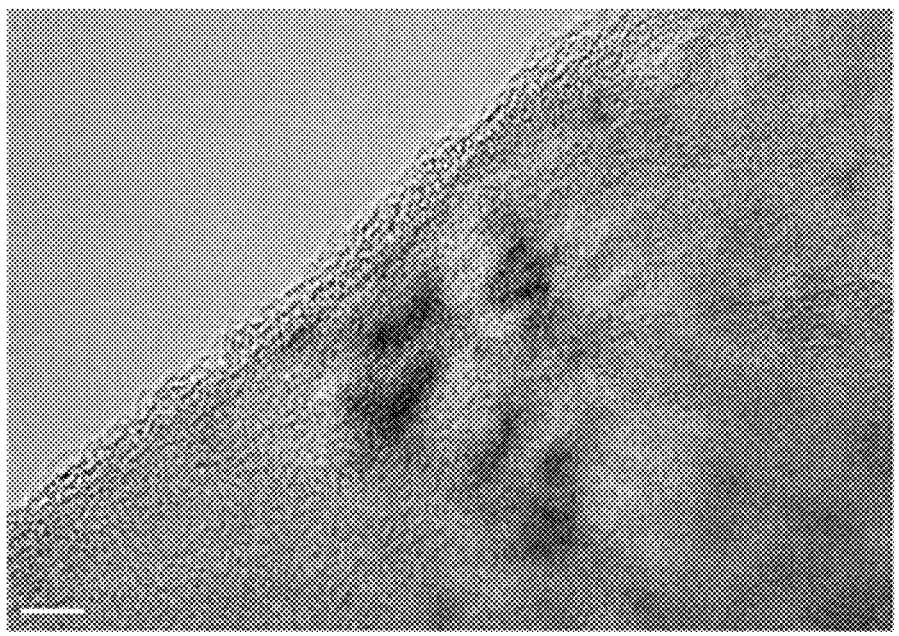
FIG. 3b is a SEM image of coarse (10 μm) SiC powder before oxidation.

FIG. 3a and FIG. 3b showed that each powder did not adhere each other after oxidation. The oxidation treatment resulted in a reduction of the surface area from 15.8 m²/g to 8.4 m²/g, indicating an improved dispersibility of the SiC powder. As a result, highly concentrated slurry could be produced.

Figure 3C:
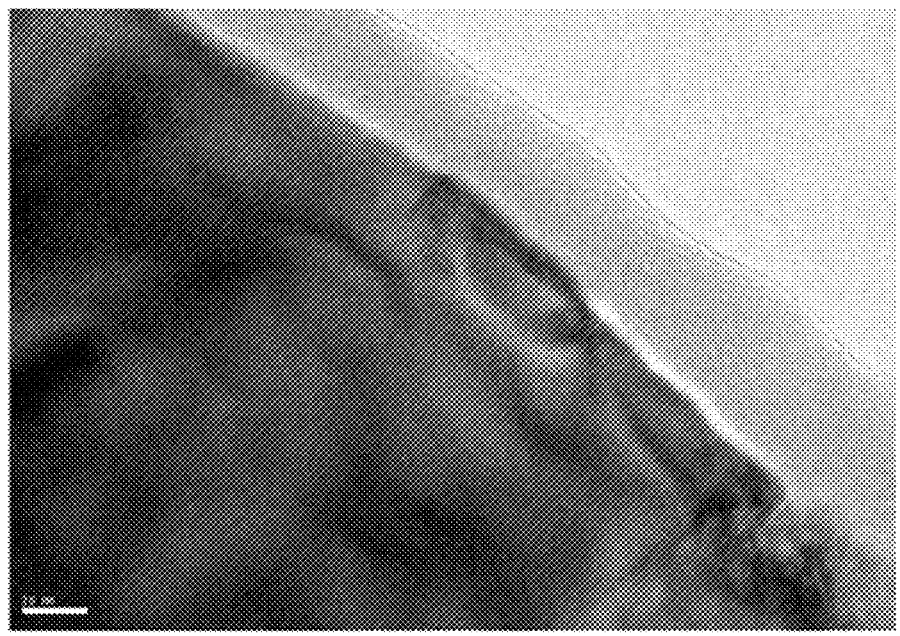
FIG. 3c is a SEM image of coarse (10 μm) SiC powder after oxidation.

Large particles had irregular shape with high aspect ratios (FIG. 3a to FIG. 3c). As the anisotropy of the particles increased, the time-average hydrodynamic shape factor increased, which further increased the viscosity of the slurry.

Figure 2A:
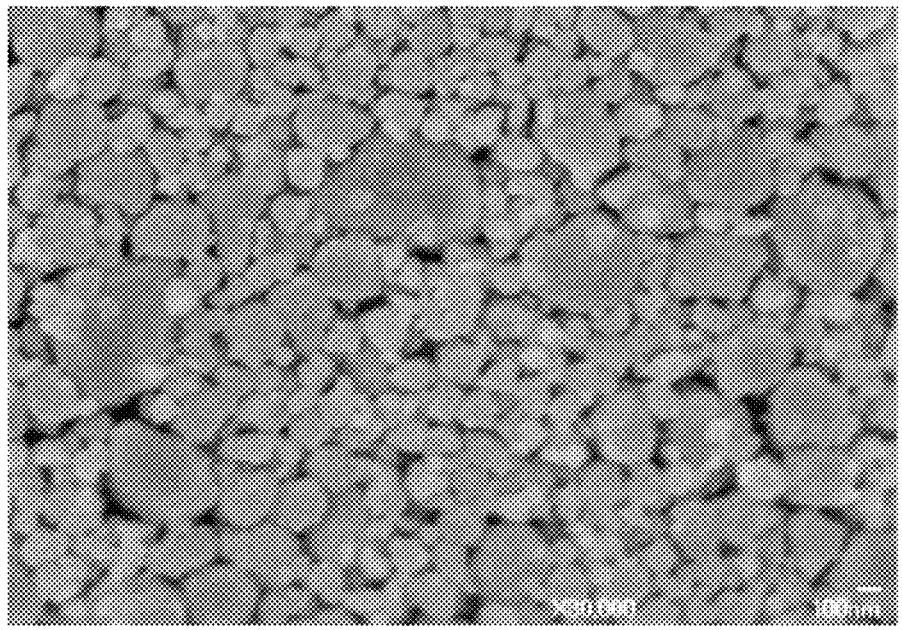
FIG. 2a is a FE-SEM image of MA-SiC powder before oxidation.
Figure 2B:
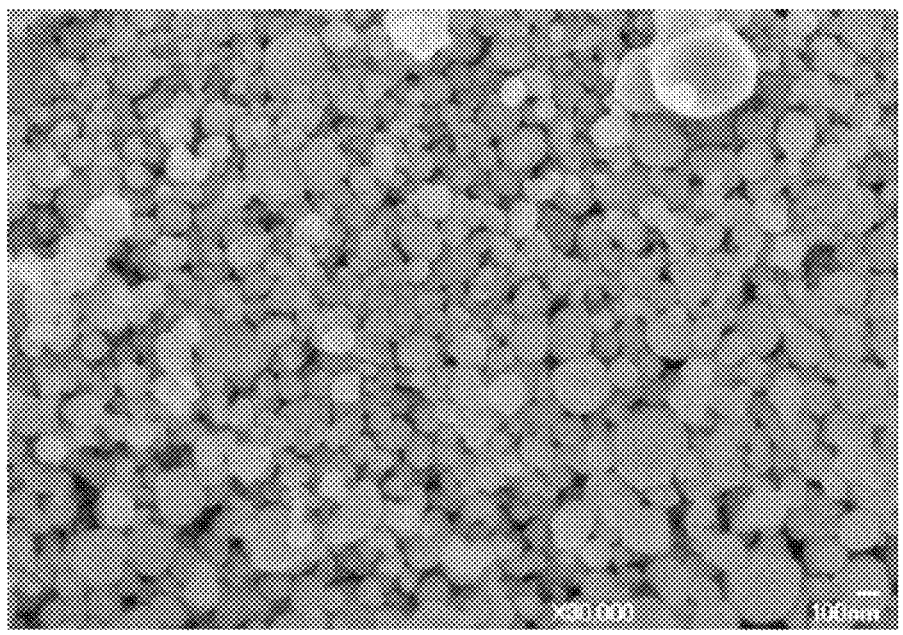
FIG. 2b is a FE-SEM image of MA-SiC powder after oxidation.
Figure 2C:
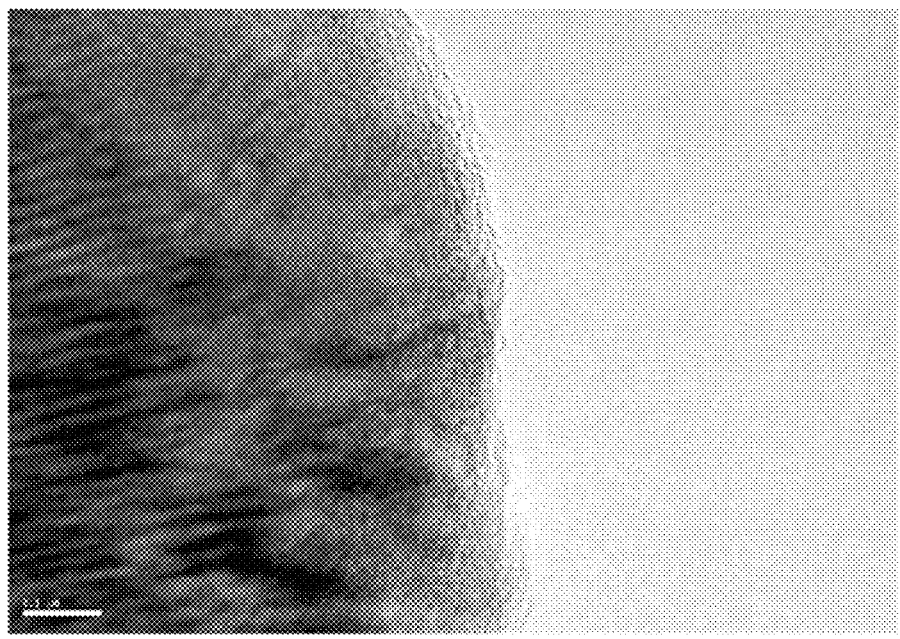
FIG. 2c is a HR-TEM image for surface analyzation of MA-SiC powder before oxidation.
Figure 2D:
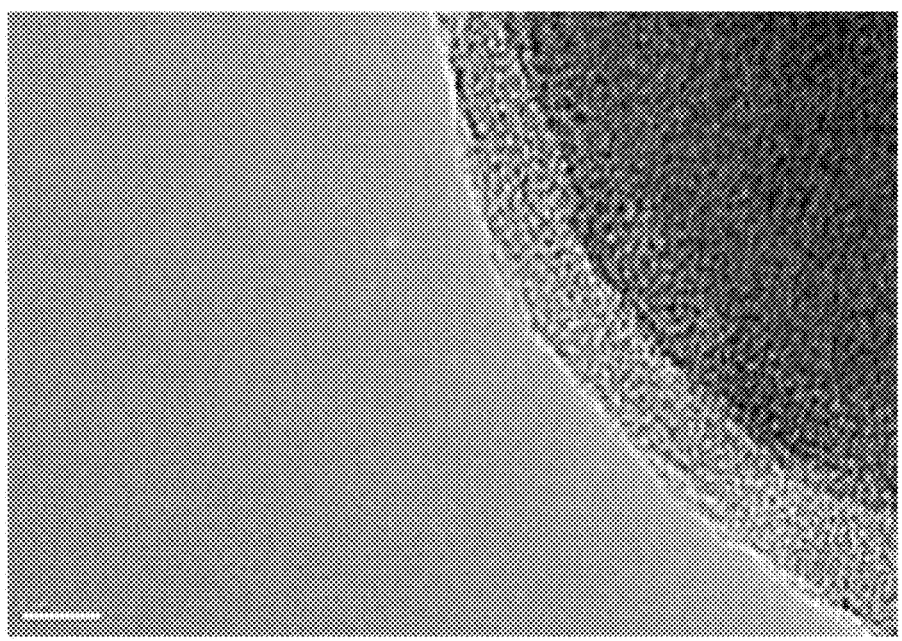
FIG. 2d is a HR-TEM image for surface analyzation of MA-SiC powder after oxidation.

Table 2 summarizes the thickness of the silicon dioxide layer of the SiC powder before and after oxidation analyzed from the HR-TEM results. According to Table 2, a very thin amorphous Si—O(H) layer of about 1-3 nm in thickness was observed on the surface of the SiC powder. After oxidation, an amorphous $SiO_2$ layer was formed, and the $SiO_2$ layer became thicker as the particle size increased due to the increase in oxidation temperature from 800° C. to 850° C. FIG. 2c and FIG. 3c show that the thickness of the $SiO_2$ layer on the surface of the fine SiC and coarse (10 μm) SiC powder is about 5 nm and 20 nm after oxidation at 800° C. and 850° C., respectively.

TABLE 2

| | Thickness of $SiO_2$ layer | |
|---|---|---|
| Abbreviations | Before oxidation (nm) | After oxidation (nm) |
| MA-SiC | 1-2 | 5-7 |
| 3 μm SiC | 2 | 5-7 |
| 5 μm SiC | 2-3 | 7-10 |
| 10 μm SiC | 2-3 | ~20 |

Experimental Example 2

Effect of a Dispersant on Viscosity of the Oxidized Fine SiC Powder

In the preparation of liquid slurries, the optimization of pH value is very crucial because pH has impacts to various properties that can change the dispersion behavior of the ceramic particles in water such as the dissociation degree of the carboxylic groups, the net particle surface charges, and polymer chain conformation. The pH value also affects the adsorption behavior of polymers on the ceramic particles. Accordingly, the stabilization and properties of the suspension depend on the change in pH value.

It was reported earlier that a liquid SiC slurry with high solid loading up to 62 vol % was prepared using fine SiC powder without oxidation. The optimum conditions for the dispersion of as-prepared fine SiC powder was pH 9 with using 0.4 wt % of a polyethylene glycol (PEG) dispersant.

Figure 4:
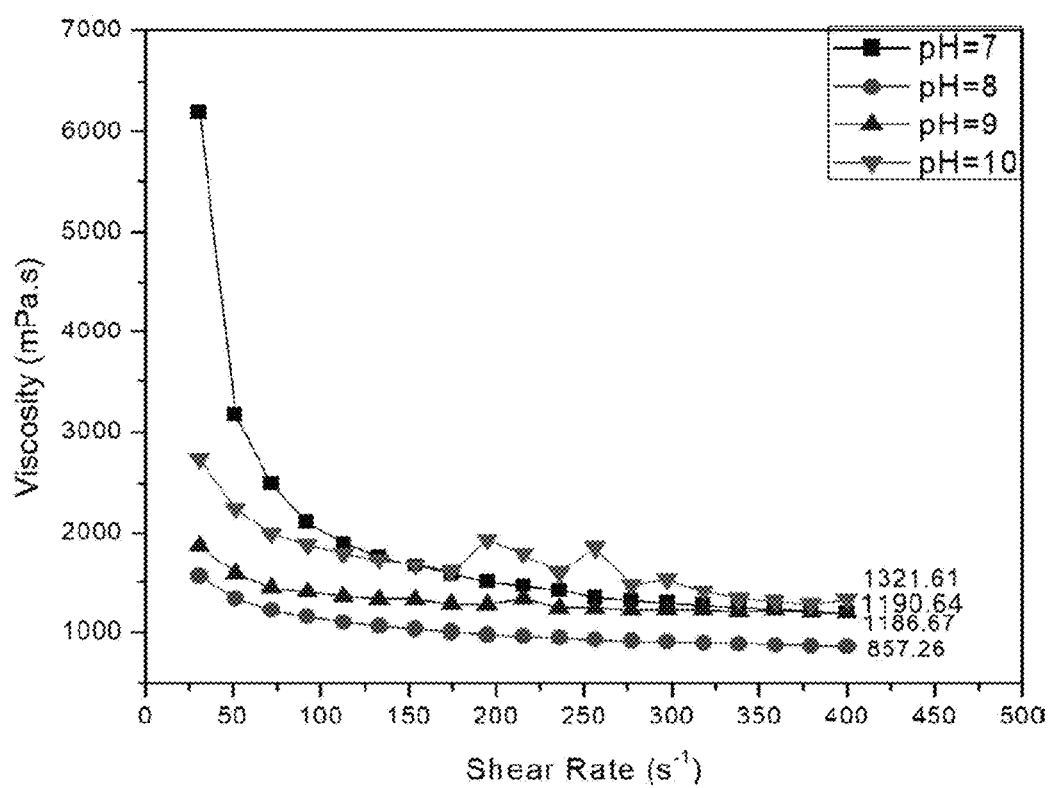
FIG. 4 is a graph illustrating effect of pH value on the viscosity of 64 vol % MA-SiC slurry.

In the present invention, a highly concentrated slurry with the solid loading up to 66 vol % was prepared using oxidized fine SiC powder. FIG. 4 is a graph showing the viscosity of a 64 vol % slurry at different pH values. The viscosity was minimum at pH 8, indicating that pH 8 was the optimum pH for the dispersion of the oxidized fine SiC slurry. Oxidation of SiC powder is one of the ways to improve dispersibility. The high temperature oxidation kinetics of the SiC powder follows the diffusion controlled mechanism by parabolic rate law. During the oxidation of the SiC below 1,573K, a silicon rich surface layer develops and the diffusion of molecular oxygen through amorphous silica dominates the oxidation process. The oxidation increases the number of silanol groups that promote dispersibility of the SiC powder. Therefore, the dispersibility of the oxidized SiC powder together with the decrease of the surface area was improved when compared with the dispersibility of the powder.

The selection of an appropriate dispersant is an important factor to improve the rheological properties of the slurry. Polyelectrolytes such as polyacrylic acid (PAA) and polymethacrylic acid (PMAA) have generally been used for the dispersion of ceramic powders in water. Other dispersants include weak cationic polyelectrolytes such as polyethyleneimine (PEI).

Polyethylene glycol (PEG) has been used as a dispersant to prepare slurries. PEG has one of the simplest structures among non-ionized water-soluble polymers. The polymer has been widely used for casting of ceramics because of its excellent stability, low toxicity, and completely combustible properties. Using an appropriate amount of PEG during the slurry preparation process, it is possible to obtain a green body with a more rigid surface and without surface exfoliation after drying.

Figure 5:
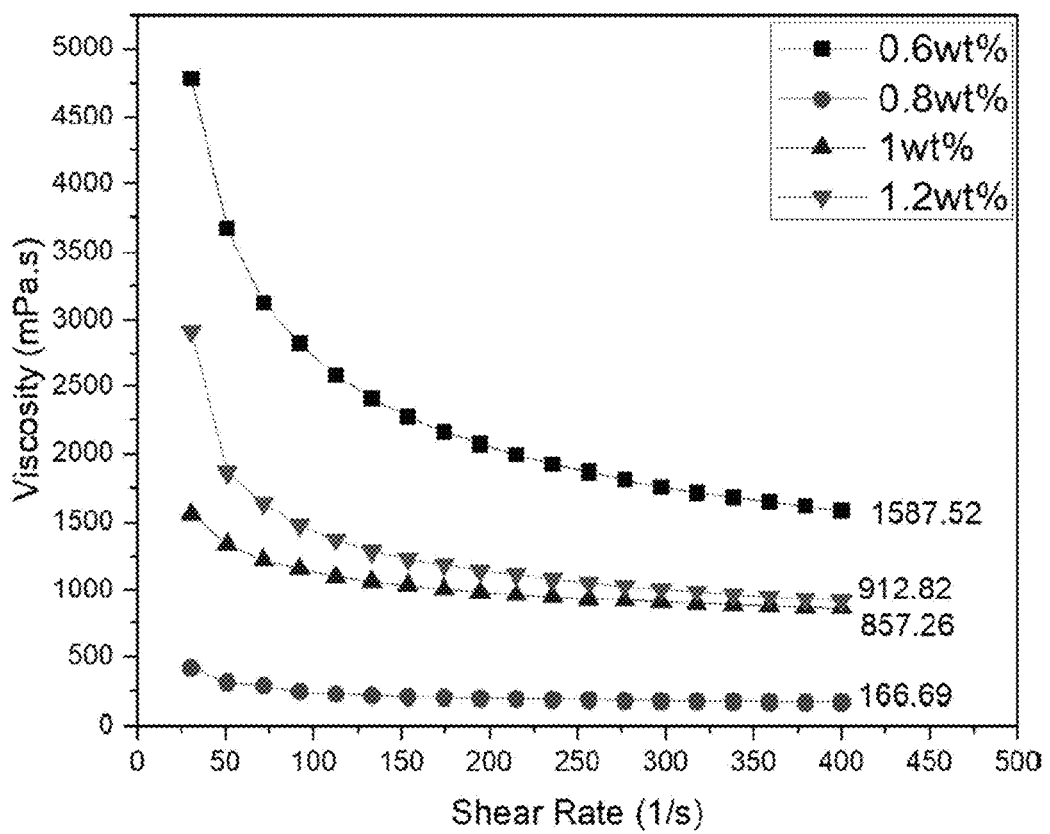
FIG. 5 is a graph illustrating effect of the amount of a dispersant on the viscosity of 64 vol % MA-SiC slurry.

FIG. 5 is a graph illustrating effect of the amount of a dispersant on the viscosity of a 64 vol % SiC slurry. The viscosity was strongly influenced by the amount of PEG. The viscosity changed between 166.7 mPa·s and 1,587.5 mPa·s as the amount of PEG increased by 0.2 wt % from 0.6 wt % to 1.2 wt %, the lowest viscosity was 166.7 mPa·s using 0.8 wt % PEG. This result was much better than the viscosity of the result obtained without the oxidation treatment (202.4 mPa·s using 62 vol % slurry). This result indicated that the optimum conditions of the 62 vol % oxidized fine SiC slurry were 0.8 wt % PEG and pH 8. Furthermore, using such optimum conditions, an aqueous fine SiC slurry with 66 vol % solid content was produced to have the viscosity of 1,147 mPa·s at pH 9. The slurry became unstable at pH 10.

Green bodies with uniform and dense packing are necessary to reduce sintering temperature and increase mechanical properties. The relative density of the cylindrical-shaped green body was calculated by measuring the dimension and weight of the sample. Considering small shrinkage during the drying of the slurry, the calculated relative density of the sample was 71%, which was much higher than the expected value derived from the solid loading (66 vol %) of the slurry. Evaporation of water during the preparation of the slurry may be a part of the cause for this phenomenon and the shrinkage with drying. During the sonication process, a part of water was evaporated and resulted in an increase in the solid content of the slurry. Drying of the slurry during the preparation process will be described in Experimental Example 3 below.

Experimental Example 3

Effect of Mixing Fine (150 nm) SiC Powders and Coarse (10 μm) SiC Powders

Figure 6:
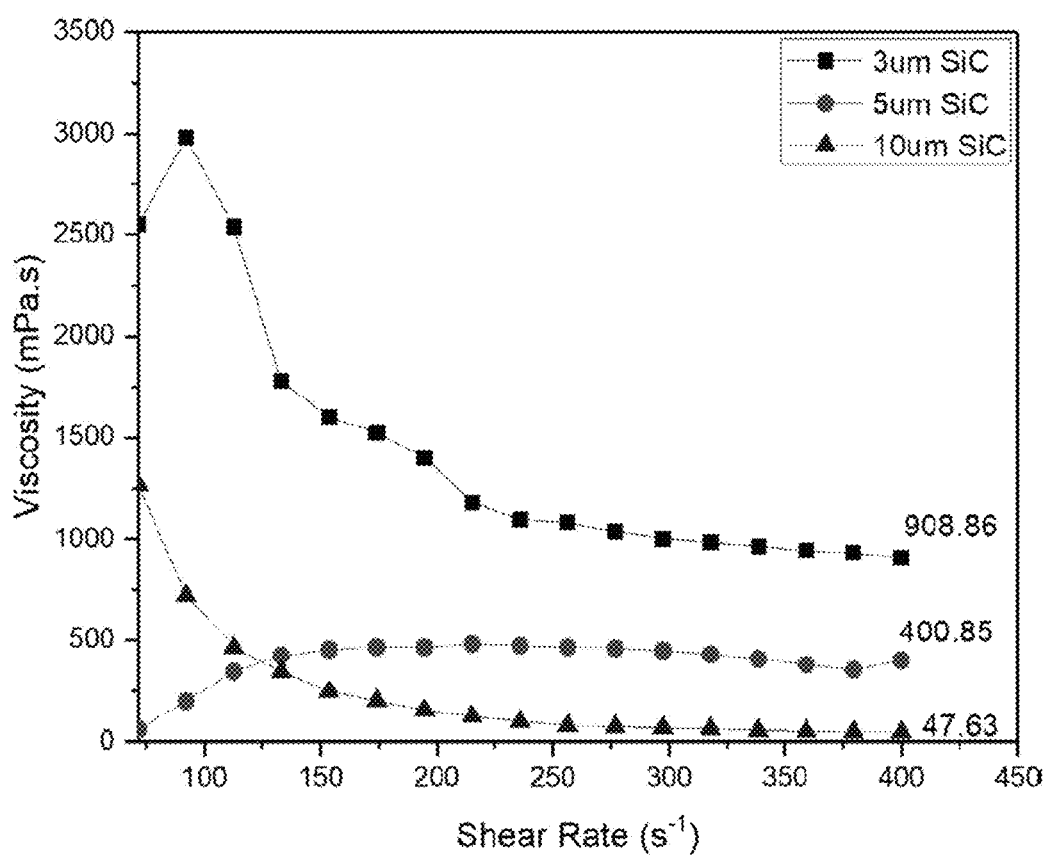
FIG. 6 is a graph illustrating the viscosity of 55 vol % slurry prepared using oxidized SiC powder with an average particle size of 3, 5, 10 μm.

FIG. 6 is a graph illustrating the viscosity of the 55 vol % slurry prepared using oxidized SiC powder with an average particle size of 3, 5, 10 μm. 0.5 wt % of PEG was added as a dispersant and pH was fixed at 9. The viscosity decreased with the increase in the particle size partly because of the low surface area. The viscosity of the slurry containing 10 μm of particles was the lowest value of 47.36 mPa·s among the tested samples. Based on the above results, the SiC powder having an average diameter of 10 μm was selected to mix with the fine SiC powder in order to reduce the viscosity and improve the rheological properties of the highly concentrated slurry.

Figure 7:
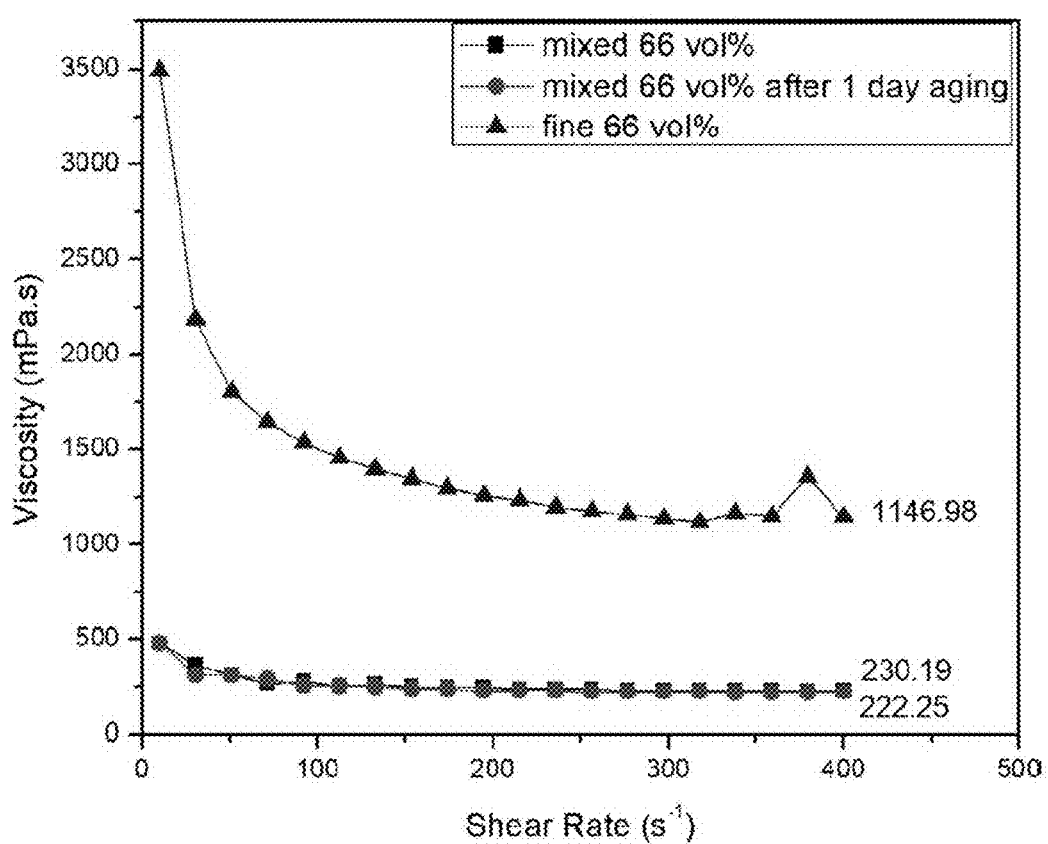
FIG. 7 is a graph illustrating the viscosity of 66 vol % mixed SiC slurry before and after 1 day aging, comparing to the viscosity of the slurry which does not contain coarse SiC powder.

The mixing of fine (150 nm) SiC powders and coarse (10 μm) SiC powders improved the rheological properties and stability of the slurry. FIG. 7 is a graph illustrating the viscosity of the 66 vol % mixed SiC slurry before and after 1 day aging, comparing to that of the slurry which does not contain the coarse SiC powder. The fine (150 nm) SiC powder and the coarse (10 μm) SiC powder were mixed in a ratio of 75:25, and the PEG content and the pH value were 1.0 wt % and pH 9, respectively. The viscosity of the 66 vol % mixed SiC (230 mPa·s) slurry was about 5 times lower than the viscosity of the slurry without the coarse SiC powder (1,147 mPa·s). This proved that the rheological properties of the SiC slurry were significantly improved by mixing the two kinds of powders. The viscosity was 222 mPa·s after aging for 24 hours without stirring, indicating good stability of the 66 vol % mixed slurry.

Figure 8:
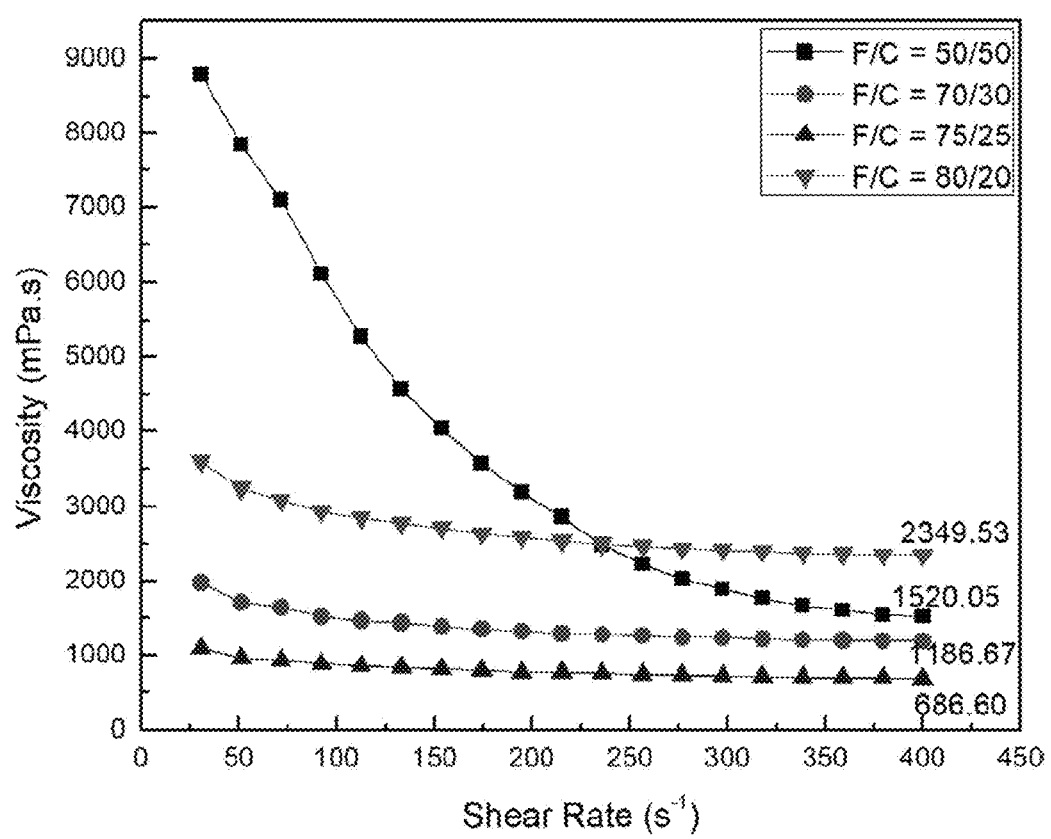
FIG. 8 is a graph illustrating the viscosity of 68 vol % mixed slurry with changing a mixing ratio of fine SiC powder and coarse SiC powder at pH 9 with 1.0 wt % of the polyethylene glycol (PEG) content.

The mixing ratio between the fine (150 nm) SiC powder and the coarse (10 μm) SiC powder had a clear effect on the viscosity and rheological properties of the mixed slurry. FIG. 8 is a graph illustrating the viscosity of a 68 vol % mixed slurry with changing a mixing ratio of fine (150 nm) SiC powder and coarse (10 μm) SiC powder using 1.0 wt % of the polyethylene glycol(PEG) content at pH 9. The mixing ratio of 75:25 was optimum to produce the 68 vol % mixed SiC slurry with the lowest viscosity of 687 mPa·s. The mixed SiC slurry with 68 vol % of the solid loading could not be prepared when the amount of the coarse SiC powder was 50% or more.

Figure 9:
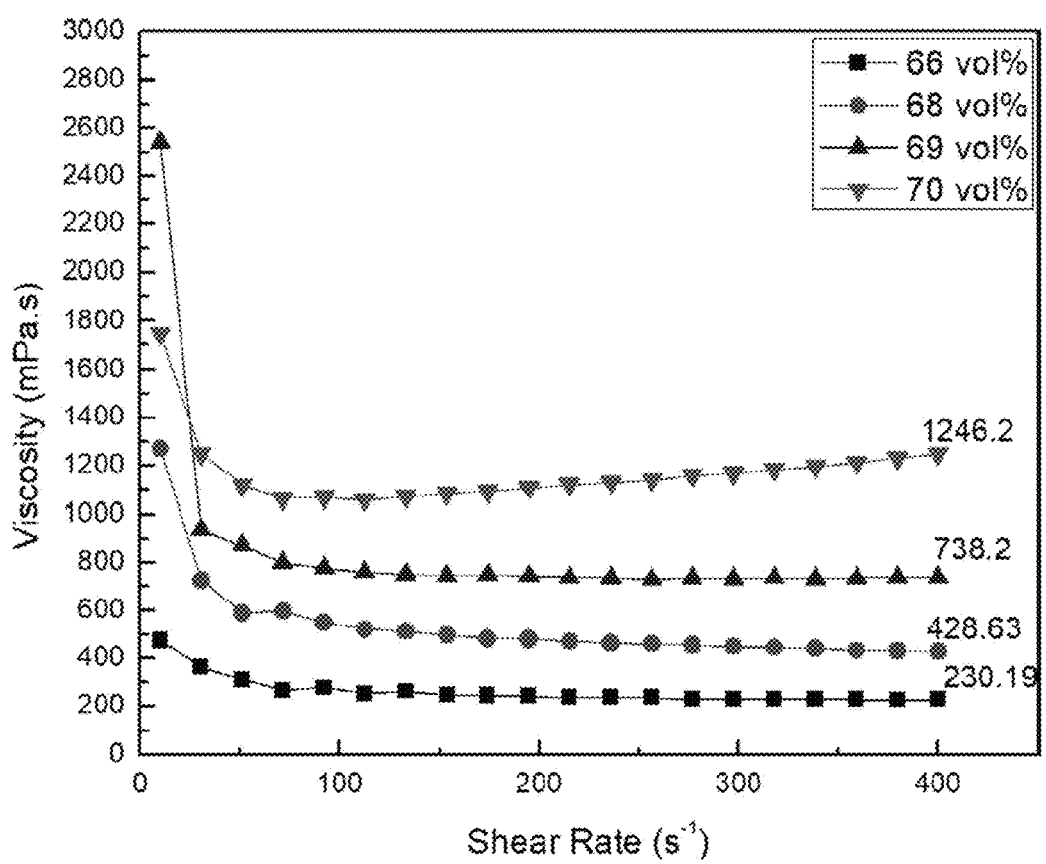
FIG. 9 is a graph illustrating the viscosity of 66, 68, 69, and 70 vol % mixed SiC slurry containing 1.0 wt % of PEG at pH 9.

FIG. 9 is a graph illustrating the viscosity of 66, 68, 69, and 70 vol % mixed SiC slurry using 1.0 wt % PEG at pH 9. The mixing ratio of the fine SiC and the coarse SiC powder was fixed as 75:25. The slurry increased in viscosity as the solid loading increased. The viscosity of the 69 vol % mixed SiC slurry was 738 mPa·s and the slurry exhibited shear thinning behavior. For highly concentrated slurries, the interaction between particles led to high viscosity at a low shear rate. As the shear rate increased, the equilibrium particle size decreased and shear thinning behavior was observed.

The concentration of the slurry further increased to 70 vol % and the viscosity decreased from 1,746 mPa·s at the shear rate of 10 s$^{-1}$ to 1,065 mPa·s at the shear rate of 71 s$^{-1}$. The viscosity slowly increased to 1,246 mPa·s at the shear rate of 400 s$^{-1}$.

M. Wei et al. also prepared a 70 vol % SiC slurry by mixing 52 wt % of coarse powder and 48 wt % of PAAM-coated powder. However, the particles were very coarse ($D_{50}$: 118 μm, 1.2 μm) and the viscosity was too high for the slurry process (16,000 mPa·s).

Figure 10:
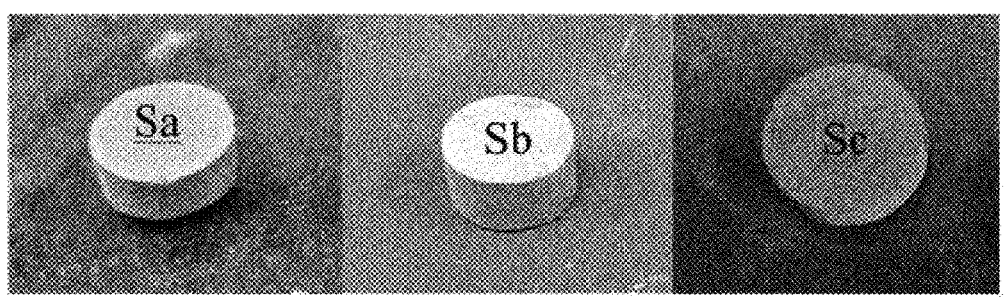
FIG. 10 is a diagram illustrating the morphology of green body after drying the 66 vol % (Sa), 68 vol % (Sb), and 70 vol % (Sc) mixed slurry at ambient conditions.

FIG. 10 is a diagram illustrating morphology of a green body after drying the 66, 68, and 70 vol % mixed slurry at ambient conditions. The relative density of the green body obtained from the 66, 68, and 70 vol % slurries was 69%, 75.7%, and 76.1%, respectively. The relative densities of the green bodies were higher than the solid content of the slurry. The same phenomenon occurred when the 66 vol % fine SiC slurry was used. A cause for this phenomenon may be due partly to the evaporation of water during dispersion. The actual solid loading of the 66, 68, 70 vol % slurry was 67.6%, 69.3% and 71% due to drying during the preparation of the slurry. The measured solid contents of the slurries were 1% higher than the designed values. Another cause for the increase in density was volume shrinkage during drying, although shrinkage rate was not accurately measured due to low shrinkage rate of 0.5% or less.

The relative density of the 70 vol % SiC green body was 76.1% by drying of the slurry, which was higher than the green density (58%) prepared by cold isostatic pressing (CIP) under 200 MPa. Matsuo et al. used CIP cycles to increase the relative density of the SiC. They could increase the density of the SiC compact from 60% to 62% by applying a cyclic pressure of 300 MPa up to 1,000 times. On the other hand, the relative density of the SiC compact produced by the slurry processing was 18% higher than that prepared by CIP and increased to 76.1%, which clearly showed the advantages of the process of the present invention.

Example 4

Preparation of SiC$_p$/SiC Composite

SiC$_p$/SiC composite was prepared through spark plasma sintering (SPS) and PIP. Heat treatment was performed for all SiC green bodies to remove the oxide layer on the powder surface consisting of silica and attached humidity using the SPS. Commercially available allylhydridopolycarbosilane (AHPCS, SMP-10, Starfire, USA) was employed as a pre-ceramic precursor. Initially, liquid AHPCS was poured into a vial and preheated to 80° C. to reduce the viscosity to improve infiltration efficiency.

The precursor with low viscosity was added to the graphite mold in which the SiC pellets were located. The graphite mold was placed in a vacuum chamber, held for 10 minutes at 10$^{-2}$ atm and filled with argon after the impregnation of the liquid precursor into the SiC green body. All processes were performed in a glove box to prevent from oxidation. Subsequently, the graphite mold was transferred to a large metal jar and connected with an argon gas bottle. The pressure inside the metal jar was increased up to 5 to 10 bar and maintained at the high pressure for 10 minutes to further promote the precursor infiltration. After the infiltration process, the graphite mold was immediately transferred to an SPS furnace under argon gas. All samples were initially crosslinked at 300° C. for 3 hours. All samples were held at 1,200, 1,400, and 1,500° C. for 1 hour, respectively. The samples were then cooled down in the SPS furnace. After densification by 4 PIP cycles, high temperature heat treatment for the synthesized samples was performed by the SPS at 1,700° C. and 2,000° C. for 1 hour under argon atmosphere. The temperature was measured by an optical pyrometer focusing on the hole in the graphite mold. Bulk density was measured by measuring the ratio of weight and volume after each PIP cycle. The weight gain was calculated by measuring the difference before and after the pyrolysis process using an electronic balance with an accuracy of 1×10$^{-4}$ g.

Experimental Example 1

Phase Composition, Bulk Density, Vickers Hardness of Pyrolyzed Precursors

The phase composition of the prepared SiC$_p$/SiC composite was identified by using X-ray dispersion analysis (XRD, CuKa, D/MAX 2500; Rigaku, Tokyo, Japan) with Cu-Kα radiation. The density of the SiC prepared by a polymer derived ceramic (PDC) route at different temperatures was tested by Gas pycnometer (HuniPyc Model 2, InstruQuest, Korea) at room temperature.

The bulk density of the $SiC_p$/SiC composite was measured using the Archimedes method. The surfaces of the samples were mechanically ground and polished up to 1 μm finish, and the bulk density was observed by scanning electron microscopy (SEM, JSM-6700F; JEOL, Tokyo, Japan) coupled with energy dispersive spectroscopy (EDS).

The Vickers hardness (Hv) of the SiCp/SiC was measured by a micro-hardness tester (AVK-A, Akashi, Tokyo, Japan) on a polished surface with a dwell time of 10 seconds at a load of 9.8 N. Ten measurement runs were taken to determine the mean value.

Experimental Example 2

Effect of Pyrolysis Temperature on Densification Behavior

Table 3 shows densities and relative densities of various SiC green bodies prepared by cold isostatic pressure press (CIP) and colloidal technology (CT). Higher relative density of SiC green body was achieved with good packing efficiency.

TABLE 3

| Sample | $\rho_{th}$ (g/cm$^3$) | $\rho_{exp}$ (g/cm$^3$) | $\rho_{re}$ (%) |
| --- | --- | --- | --- |
| CIP | 3.2 | 1.837 | 57.4 |
| 62 Vol % (V62) | 3.2 | 2.137 | 66.8 |
| 70 Vol % (V70) | 3.2 | 2.449 | 76.55 |

*$\rho_{th}$: theoretical density
$\rho_{exp}$: measured density
$\rho_{re}$: relative density The SiC green body prepared by the CIP was selected to evaluate the effect of pyrolysis temperature on densification behavior because it is easy to prepare. Typical densification behavior of SiCp/SiC is shown in FIG. 11 by measuring the relative density after each PIP cycle.

FIG. 11 is a graph illustrating the relative density depending on PIP cycles at heating temperature of 1200° C./hr, 1400° C./hr, and 1500° C./hr.

As shown in FIG. 11, the relative density increased with increasing the heating temperature. The highest relative density was achieved for the group at the heating temperature of 1,500° C. The relative density of the group at the heating temperature of 1,500° C. increased linearly till 4 PIP cycles. A turning point of the relative density where an increasing rate decreased was observed after 3 PIP cycles for the group at the heating temperature of 1400° C. and after 2 PIP cycles for the group at the heating temperature of 1200° C., respectively. Table 4 shows the density of the pyrolyzed specimens at various temperatures. The density of the SiCp/SiC materials increased with temperature.

TABLE 4

| Sample | Synthesis Condition | Powder density (g/cm$^3$) |
| --- | --- | --- |
| C12 | 1200° C.-50° C./min | 2.396 |
| C14 | 1400° C.-50° C./min | 2.455 |
| C15 | 1500° C.-50° C./min | 2.469 |

TABLE 4-continued

| Sample | Synthesis Condition | Powder density (g/cm$^3$) |
| --- | --- | --- |
| C10 | 1500° C.-10° C./min | 2.409 |
| C100 | 1500° C.-100° C./min | 2.469 |

As shown in Table 4 above, the highest density of 2.469 g/cm$^3$ was observed at 1,500° C.

The effect of pyrolysis temperature on the mechanical properties was evaluated. Pyrolysis at high temperatures showed an improvement in hardness. The increased density induced reductions of the amount of pores and the size of the pores. Therefore, based on the above, pyrolysis at 1,500° C. can be selected as an optimum pyrolysis condition.

Experimental Example 3

Effect of Green Body Density (Green Density) and Infiltration Method for Densification Behavior Infiltration plays an important role in densification behavior. Vacuum impregnation (VI) and pressure impregnation (PI) are usually applied to precursor impregnation.

High vacuum level is difficult to obtain and requires specific equipment. In this regard, the combination of VI and PI can increase the impregnation efficiency.

FIG. 12a is a graph illustrating the relative density depending on PIP cycles when a liquid ceramic precursor is impregnated through the vacuum impregnation (VI) in a green body prepared by cold isostatic pressing (CIP), a green body prepared with 62 vol % slurry, a green body prepared with 70 vol % slurry. FIG. 12b is a graph illustrating the relative density depending on PIP cycles when a liquid ceramic precursor is impregnated through the vacuum and pressure assisted impregnation (VPAI) in a green body prepared by cold isostatic pressing (CIP), a green body prepared with 62 vol % slurry, a green body prepared with 70 vol % slurry.

As shown in FIG. 12a and FIG. 12b, the relative density of the final composite increased with increasing the green body density. The highest relative density of 86.1% was achieved using the 70 vol % slurry by vacuum impregnation (VI). FIG. 12b shows the densification behavior of various green bodies prepared by VPAI. The highest relative density of 88.06% was achieved by VPAI with only 4 PIP cycles using the 70 vol % slurry, which was about 2% higher than that achieved by VI, indicating that the VPAI provided better impregnation efficiency compared to the VI. The density kinetics of cold isostatic pressing (CIP) and the 70 vol % slurry displayed a linear relationship, while a nonlinear behavior was observed with the 62 vol % slurry. This is because the pore size distributed in the CIP and the 70 vol % slurry is wider than that in the 62 vol % slurry.

FIG. 13a and FIG. 13b are graphs illustrating the pore size distribution of various green bodies, in which FIG. 13a is a graph illustrating the pore size distribution of SiC green bodies and FIG. 13b is a graph illustrating the pore size distribution of samples after 4 PIP cycles at a pyrolysis temperature of 1,500° C.

As shown in FIG. 13a, the CIP green body with a lower relative density among the SiC powder green bodies had a large amount of pores and a relatively large pore size. On the other hand, the 62 vol % green body with a higher density had a smaller amount of pores and a smaller pore size compared to the CIP green body, which thus pore blockage was more easily found. The 70 vol % slurry containing coarse powders and fine powders had a very small pore size due to the high density, but the pore size was widely distributed from large pores to small pores.

Thus, as shown in FIG. 13b, the green body prepared from the 70 vol % slurry, in which coarse powders and fine powders were mixed, showed less pore blockage during 4 PIP cycles. In the case of the sample after 4 PIP cycles, the pore size was similar in all cases, but the volume of pores increased in the order of CIP>62 vol % >70 vol %.

Experimental Example 4

Effect of Relative Density of SiC Green Bodies on Room and High Temperature Mechanical Properties of Particle-Reinforced Composites (PRC)

FIG. 14 shows the hardness of the particle-reinforced composite (PRC) before and after heating at high temperature for 1 hour. In the as-produced samples, the hardness increased strongly as the relative density of the SiC green body increased. The hardness of the PRC using the slurry of 70 vol % exhibited Vickers hardness value of 19 GPa after 4 PIP cycles. The value is similar to the hardness (21-23 GPa) of the SiC fully sintered using an Al additive. The results clearly showed beneficial effects of the density of the green body on the mechanical properties of the PRC.

The hardness of the sample prepared by VPAI was higher than that of the sample prepared by VI. This is because of the improvement in precursor impregnation and consequent high relative density of the PRC.

In all cases, the hardness increased after heating at 1,700° C. or above. In particular, this increase was the most distinct in the sample prepared with the 62 vol % slurry. The hardness of the sample prepared from the 70 vol % slurry had Vickers hardness value of 23 GPa after heat treatment at 2,000° C. The hardness of the PRC improved with increasing the heating temperature up to 2,000° C.

This result was clearly different from the existing results where the mechanical properties of precursor derived ceramics (PDC) are deteriorated after heating at temperature of 1,400° C. or above. It has been reported that the mechanical properties of precursor derived ceramics (PDC) and SiC-based composite materials manufactured by the PIP process are deteriorated after heating at temperature of 1,400° C. or above because of the decomposition and crystallization of the PDC. Such decomposition and crystallization of the PDC, which is thermally relatively unstable inside the particle-reinforced composite (PRC) and ceramic matrix composite (CMC), were minimized by significantly increasing an amount of a thermally stable SiC filler. In addition, the bond between the SiC filler and the PDC matrix increased at high temperature where the hardness of the PRC increased.

FIG. 15a to FIG. 15e are diagrams illustrating microstructures and indent morphology of particle-reinforced composites (PRCs).

FIG. 15a is a diagram illustrating microstructure and indent morphology of a particle-reinforced composite prepared by cold isostatic pressing (CIP), FIG. 15b is a diagram illustrating microstructure and indent morphology of a particle-reinforced composite prepared with a 62 vol % slurry, and FIG. 15c is a diagram illustrating microstructure and indent morphology of a particle-reinforced composite prepared with a 70 vol % slurry.

FIG. 15d is a diagram illustrating 70 vol % particle-reinforced composite after heat-treating the sample of FIG. 15c at 1,700° C. FIG. 15e is a diagram illustrating 70 vol % particle-reinforced composite after heat-treating the sample of FIG. 15c at 2,000° C. As shown in FIG. 15d and FIG. 15e, after the heat treatment at 1,700° C., the micropores did not increase in size except that some coarse pores were newly formed. On the other hand, after the heat treatment at 2,000° C., the number of micropores decreased but the size of the micropores increased overall. In addition, it was found that coarse pores were newly locally formed.

FIG. 16 is a graph illustrating the pore size distribution after heat-treating a particle-reinforced composite prepared by 4 PIP cycles using a 70 vol % slurry at 1,700° C. and 2,000° C. under Ar atmosphere for 1 hour. Referring to FIG. 16, as in the SEM observation, the micropores did not increase in size except that some coarse pores were newly formed after the heat treatment at 1,700° C. On the other hand, after the heat treatment at 2,000° C., the number of pores decreased but the size of the pores increased overall. In addition, it was found that coarse pores of 10 μm or more were newly formed after the heat treatment at both 1,700° C. and 2,000° C.

FIG. 17a and FIG. 17b are TEM images of particle-reinforced composites prepared by 4 PIP cycles using a 70 vol % slurry.

Referring to FIG. 17a and FIG. 17b, it was noted that most of the matrix was filled with the SiC filler and there was a small amount of PDC around some pores. As such, since the sample prepared by the PIP process using the ultra-high concentration slurry was composed of mostly the thermally stable SiC filler and a small amount of the relatively unstable PDC, the number of PIP cycles could be reduced and the thermal stability of the sample prepared by the PIP process could be improved drastically.

It was found from the TEM analysis and density-mass relationship calculation that a content of the precursor-derived ceramics in the SiC particle-reinforced SiC composite prepared by the present invention was from maximum 37 vol % obtained from the SiC composite with relative density of 94%, which is prepared with a 58 vol % slurry by 7 PIP cycles, to minimum 9.5 vol % obtained from the SiC composite with relative density of 85%, which is prepared with a 70 vol % slurry by 3 PIP cycles. When the content of the precursor-derived ceramics in the SiC particle-reinforced SiC composite prepared by the PIP process and having the relative density of 85-94% and in a matrix inside the ceramic matrix composite (CMC) in which the SiC particle-reinforced SiC composite material is used as the matrix is 9.5 to 37 vol %, two advantages of shortening the process time by reducing the number of PIP cycles and securing excellent thermal stability are the most important features of the present invention.

FIG. 18 is a TEM image of particle-reinforced composite prepared by 4 PIP cycles with the 70 vol % slurry after heat-treating under Ar atmosphere for 1 hour at 2,000° C. By sintering and densification between the fillers, the number of pores reduced while the size of individual pore increased and PDCs existed inside the pores. The number of pores and the amount of PDC observed through the TEM were small. As described above, this is because of a small content of the PDC present in the SiC particle-reinforced SiC composite material having less number of the PIP cycles and excellent high temperature characteristics of the present invention.

Experimental Example 5

Preparation of SiC$_f$/SiC CMC by impregnation of SiC Slurry and PIP Process

FIG. 19a is an image of the slurry, prepared by the method according to an embodiment of the present invention, impregnated into a SiC fiber preform. FIG. 19b is an image of SiC$_f$/SiC ceramic matrix composite (CMC) prepared by repeating the PIP process in a SiC fiber preform.

More particularly, FIG. 19a is an image of the sample which is processed through impregnating the slurry prepared by the method of the present invention in a SiC fiber preform prepared by a centrifugal formation process, drying and stabilizing the slurry-impregnated SiC fiber preform, and heat-treating at 1550° C. for 2 hours under vacuum. FIG. 19b is an image illustrating SiC$_f$/SiC CMC prepared by impregnating a liquid AHPCS ceramic precursor in the SiC fiber preform of FIG. 19a in which the SiC slurry is impregnated, followed by thermosetting at 300° C., and then repeating the PIP cycles at 1400° C. in Ar atmosphere. It can be seen that this process can be easily applied to the production of the CMC.

As described above, according to the present invention, the PIP cycle required to prepare a SiC matrix having a high density can be drastically reduced from six to eight cycles to four cycles. The hardness can be improved to 20 GPa or more similar with that of fully sintered SiC, and the mechanical properties after the heat treatment at high temperature of 2000° C. can increase unlike decrease in the existing process.

What is claimed is:

1. A slurry composition for ceramic matrix composites, comprising:
   at least 58 vol % of a SiC filler;
   a dispersion; and
   a dispersant,
   wherein the SiC filler consists of only fine particles having a $D_{50}$ diameter of more than 100 nm and less than 200 nm or consists of the fine particles and coarse particles having a $D_{50}$ diameter of 3 μm to 20 μm in a ratio of 2:1 to 4.5:1.

2. The slurry composition of claim 1, wherein the SiC filler is oxidized.

3. The slurry composition of claim 1, wherein the dispersion medium is water and the dispersant is included in an amount of 0.6 to 1.2 wt % based 100 wt % of SiC filler in the slurry composition for ceramic matrix composites.

4. A SiC particle-reinforced SiC composite densified through precursor impregnation pyrolysis (PIP) of a green body prepared by drying a slurry composition for ceramic matrix composites according to claim 1,
   wherein the composite has a hardness of 10 GPa or more after 4 or less PIP cycles.

5. The SiC particle-reinforced SiC composite of claim 4, wherein an amount of a precursor-derived ceramic phase in the SiC particle-reinforced SiC composite is 9.5 to 37 vol %.

6. The SiC particle-reinforced SiC composite of claim 4, wherein a density of the SiC particle-reinforced SiC composite is 2.5 to 3 g/cm$^3$.

7. A method for manufacturing a SiC composite, the method comprising:
   preparing a slurry composition for ceramic matrix composites of claim 1;
   impregnating the slurry into ceramic fiber bundles, carbon fiber bundles, or a fiber preform made thereof;
   drying and stabilizing the fiber preform in which the slurry is impregnated;
   impregnating a liquid ceramic precursor into the preform and curing the same to form a ceramic matrix composite preform; and
   pyrolyzing the ceramic precursor in the ceramic matrix composite preform.

8. The method of claim 7, further comprising heat treating the slurry-impregnated fiber preform at a temperature of 1500° C. or higher to promote crystallization of an amorphous SiC filler and to remove oxides from the surface of the SiC filler at the step of drying and stabilizing the fiber preform.

9. The method of claim 7, wherein the step of impregnating a liquid ceramic precursor into the preform and curing the same comprises thermally curing a liquid ceramic precursor to 150 to 350° C.

10. The method of claim 7, wherein the ceramic precursor comprises at least one of polysilane and polycarbosilane.

* * * * *